(12) United States Patent
Siri

(10) Patent No.: US 7,193,872 B2
(45) Date of Patent: Mar. 20, 2007

(54) SOLAR ARRAY INVERTER WITH MAXIMUM POWER TRACKING

(76) Inventor: Kasemsan Siri, 16523 Purche Ave., Torrance, CA (US) 90504

( * ) Notice: Subject to any disclaimer, the term of this patent is extended or adjusted under 35 U.S.C. 154(b) by 223 days.

(21) Appl. No.: 11/045,821

(22) Filed: Jan. 28, 2005

(65) Prior Publication Data

US 2006/0171182 A1    Aug. 3, 2006

(51) Int. Cl.
H02M 3/24    (2006.01)
(52) U.S. Cl. ........................................................ 363/95
(58) Field of Classification Search ................. 363/95, 363/98; 307/45, 51; 323/205, 207, 906
See application file for complete search history.

(56) References Cited

U.S. PATENT DOCUMENTS

| | | |
|---|---|---|
| 4,143,314 A | 3/1979 | Gruber |
| 4,144,668 A | 3/1979 | Darncharnjitt |
| 4,375,662 A | 3/1983 | Baker |
| 4,404,472 A | 9/1983 | Steigerwald |
| 4,445,049 A | 4/1984 | Steigerwald |
| 4,528,503 A | 7/1985 | Cole |
| 4,626,983 A | 12/1986 | Harada et al. |
| 4,649,334 A | 3/1987 | Nakajima |
| 4,677,345 A | 6/1987 | Nilssen |
| 4,677,366 A | 6/1987 | Wilkinson et al. |
| 4,720,667 A | 1/1988 | Lee et al. |
| 4,720,668 A | 1/1988 | Lee et al. |
| 4,750,102 A | 6/1988 | Yamano et al. |
| 4,791,542 A | 12/1988 | Piaskowski |
| 4,866,367 A | 9/1989 | Ridley et al. |
| 4,885,675 A | 12/1989 | Henze et al. |
| 4,888,702 A | 12/1989 | Gerken et al. |
| 4,992,919 A | 2/1991 | Lee et al. |
| 5,111,372 A | 5/1992 | Kameyama et al. |
| 5,157,269 A | 10/1992 | Jordan et al. |
| 5,164,890 A | 11/1992 | Nakagawa et al. |
| 5,262,930 A | 11/1993 | Hua et al. |

(Continued)

OTHER PUBLICATIONS

R. Ramakumar, et al.; "Design Scenarios for Integrated Renewable Energy Systems"; IEEE Transactions on Energy Conversion, Dec. 1995, pp. 736-746, vol. 10, No. 4.

(Continued)

*Primary Examiner*—Adolf Berhane
(74) *Attorney, Agent, or Firm*—Matthew R. Schantz; Bingham McHale, LLP

(57) ABSTRACT

An inverter for use in connecting a DC power source to the utility grid includes a single DC-DC conversion stage, maximum (source) power tracking, and current control based on feed-forward compensation as a function of an input power commanding voltage, rectified utility line voltage, and either a scaled and squared inverse or a scaled inverse of RMS utility line voltage. Various embodiments also include over-voltage, over-current, under-voltage, and over-temperature protection, and a stand-by battery with its battery management control, while others adapt a multiple-channel front-end distributed power system with distributed maximum power tracking to serve as a single DC power source input to the inverter system downstream with controllers, emergency or auxiliary loads, and alternative current feedback control systems for providing an in-phase output current with respect to the utility grid voltage while absorbing maximum power available from the DC power source and minimally utilizing the stand-by battery for maximal system reliability.

29 Claims, 29 Drawing Sheets

U.S. PATENT DOCUMENTS

| | | | |
|---|---|---|---|
| 5,268,832 | A | 12/1993 | Kandatsu |
| 5,287,261 | A | 2/1994 | Ehsani |
| 5,321,600 | A | 6/1994 | Fierheller |
| 5,359,276 | A | 10/1994 | Mammano |
| 5,381,327 | A | 1/1995 | Yan |
| 5,434,767 | A | 7/1995 | Batarseh et al. |
| 5,592,074 | A | 1/1997 | Takehara |
| 5,615,097 | A | 3/1997 | Cross |
| 5,623,171 | A | 4/1997 | Nakajima |
| 5,636,106 | A | 6/1997 | Batarseh et al. |
| 5,648,731 | A | 7/1997 | Decker et al. |
| 5,654,883 | A | 8/1997 | Takehara |
| 5,724,237 | A | 3/1998 | Hunter |
| 5,747,967 | A | 5/1998 | Muljadi et al. |
| 5,751,133 | A | 5/1998 | Sato et al. |
| 5,761,057 | A | 6/1998 | Muchenberger |
| 5,801,519 | A | 9/1998 | Midya et al. |
| 5,847,549 | A | 12/1998 | Dodson, III |
| 5,869,956 | A | 2/1999 | Nagao et al. |
| 5,923,100 | A | 7/1999 | Lukens et al. |
| 5,926,004 | A | 7/1999 | Henze |
| 5,949,636 | A | 9/1999 | Johnson et al. |
| 5,962,989 | A | 10/1999 | Baker |
| 6,002,596 | A | 12/1999 | Mayer et al. |
| 6,008,589 | A | 12/1999 | Deng et al. |
| 6,009,000 | A | 12/1999 | Siri |
| 6,037,758 | A | 3/2000 | Perez |
| 6,046,919 | A | 4/2000 | Madenokouji et al. |
| 6,057,665 | A | 5/2000 | Herniter et al. |
| 6,088,250 | A | 7/2000 | Siri |
| 6,111,767 | A * | 8/2000 | Handleman ................ 363/95 |
| 6,191,568 | B1 | 2/2001 | Poletti |
| 6,255,804 | B1 | 7/2001 | Herniter et al. |
| 6,281,485 | B1 | 8/2001 | Siri |
| 6,291,764 | B1 | 9/2001 | Ishida et al. |
| 6,339,538 | B1 * | 1/2002 | Handleman ................ 363/95 |
| 6,362,980 | B1 | 3/2002 | Ohashi et al. |
| 6,369,462 | B1 | 4/2002 | Siri |
| 6,404,655 | B1 * | 6/2002 | Welches ................... 363/41 |
| 6,433,522 | B1 | 8/2002 | Siri |
| 6,577,513 | B1 | 6/2003 | Chang et al. |
| 6,583,994 | B2 * | 6/2003 | Clayton et al. ........ 363/21.18 |
| 6,605,881 | B2 | 8/2003 | Takehara et al. |
| 6,690,590 | B2 | 2/2004 | Stamenic et al. |
| 6,775,160 | B2 | 8/2004 | Siri |

OTHER PUBLICATIONS

R. Matson, et al.; "DOE/NREL Fundamental and Exploratory Research Into Solar Cells"; NREL/CP-520-31484, IEEE PV Specialists Conference, May 2002, pp. 1343-1347.

L.H. Dixon; "High Power Factor Switching Preregulator Design Optimization"; Unitrode Power Supply Design Seminar Manual SEM800, 1992.

J. Abu-Qahouq, et al.; "Unified Steady-State Analysis of Soft-Switching DC-DC Converters"; IEEE Transactions on Power Electronics, Sep. 2002, pp. 684-691, vol. 17, No. 5.

F. Lee; "State Plane Analysis of Parallel Resonant Converter"; IEEE Power Electronics Specialists Conference (PESC) Rec., 1985, pp. 56-73.

K. Hwa Liu, et al.; "Zero-Voltage Switching Technique in DC/DC Converters"; IEEE Transactions on Power Electronics, Jul. 1990, pp. 293-304, vol. 5.

D. Divan; "Design Considerations For Very High Frequency Resonant Mode DC/DC Converters";; IEEE Transactions on Power Electronics, Jan. 1987, vol. PE-2, No. 1, pp. 45-54.

Y. Kang, et al.; "Analysis and Design of a Half-Bridge Parallel Resonant Converter"; IEEE Transactions on Power Electronics, Jul. 1988, vol. 3, No. 3, pp. 254-265.

V. Vorperian; "High-Q Approximation In The Small-Signal Analysis Of Resonant Converters;" IEEE Power Electronics Specialists Conference (PESC) Rec., Jun. 1995, pp. 707-715.

Siri, Kasemsan.; Maximum Power Tracking in Parallel Connected Converters; IEEE, Jul. 1993, pp. 935-945.

Wu, Wenkai et al.; "DSP-Based Multiple Peak Power Tracking for Expandable Power System"; 2003, pp. 525-530.

Siri, Kasemsan; "Study of System Instability in Solar-Array-Based Power Systems"; IEEE, Jul. 2000, pp. 957-963.

Siri, Kasemsan et al.; "Fault-Tolerant Scaleable Solar Power Bus Architectures with Maximum Power Tracking"; Power and Engineering Section, 2001.

Deng, Songquan et al.; "A New Control Scheme for High-Frequency Link Inverter Design"; 2003, pp. 512-517.

Mao, Hong et al.; New Zero-Voltage-Switching Half-Bridge DC-DC Converter and PWM Control Method; 2003, pp. 635-640.

Siri, Kasemsan et al.; "Sequentially Controlled Distributed Solar-array Power System with Maximum Power Tracking"; IEEE, 2004, pp. 1-10.

* cited by examiner

MODE I ———
MODE II - - -

SOLAR ARRAY INVERTER WITH MAXIMUM POWER TRACKING

FIELD OF THE INVENTION

The present invention relates to electrical power supply and interconnection systems. More specifically, the present invention relates to systems and methods for connecting the electrical output of solar arrays to the utility power grid.

BACKGROUND

Typically, DC-to-AC power conversion from a solar-array source to the utility grid is achieved in two power converter stages to transfer the maximum available power from the solar array and supply an in-phase AC current into the utility grid. See, for example, U.S. Pat. Nos. 6,281,485 and 6,369,462; and D. K. Decker, "Method for Utilizing Maximum Power from a Solar Array," JPL Quarterly Technical Review, 1972, Vol. 2, No. 1, pages 37–48. One power stage is controlled to track the array peak power, and the other power stage controlled to deliver the AC current to the grid. This typical configuration leads to higher component counts and possibly reduced power conversion efficiency. One benefit of the two stages of power conversion is simplicity of the control design, since the two control loops are decoupled. One control loop tracks the peak-power array voltage by controlling a first converter that is interfaced between the solar-array source and the second converter, while the other control loop produces the rectified sinusoidal current being fed from the second converter to the utility grid through a switching bridge topology that is synchronized to the utility frequency. Such decoupled pairs of control loops are described, for example, in "Sequentially-Controlled Distributed Solar-Array Power System with Maximum Power Tracking" by Kasemsan Siri and Kenneth A. Conner, presented at the Aerospace Conference, Mar. 6–12, 2004, Big Sky, Mont.

The output voltage of the first converter, which becomes the input voltage of the second converter, does not need to be so well regulated and may have significant voltage ripple depending on the size of the output filter capacitor and the operating power level. Therefore, the two cascaded-power-stage configuration provides design flexibility in choices of output voltage level and size of the output filter capacitance, as well as the input filter capacitance of the first power stage. For applications that require low operating solar-array voltage (less than 100V) for safety reasons, the two-cascaded-stage configuration provides more design freedom to choose economical power components, especially the input and output filter capacitors. In this configuration, the fundamental frequency of the solar-array AC voltage ripple can be selectively controlled to be different from (or not synchronized with) the multiples of the utility frequency. Power conversion efficiency of 85% to 90% is achieved in some cascaded-power-stage designs.

There is thus a need for further contributions and improvements to DC-to-AC power conversion technology.

SUMMARY

When power conversion efficiency greater than 90% is required, switch-mode DC-to-AC power conversion in one power stage is preferred, though it comes with some sacrifice of design freedom in choices of input filter capacitors and more complex control loops that are not independent from one another. Some embodiments of the present invention employ a novel control approach and power architecture that process power transferred from the DC source (such as a solar array) to the AC utility grid in a single stage of power processing (one DC-DC converter). In this approach, the input filter capacitance across the solar array source is preferably selected to ensure the acceptable AC array-voltage ripple as well as robust stability of the array voltage and the in-phase AC current delivered to the utility grid.

It is an object of some embodiments of the present invention to supply regulated sinusoidal AC current to the utility grid from a solar array or other DC power source with maximum power tracking in a single stage of DC-DC power conversion. It is an object of other embodiments to maximally utilize the available power of the array source as load demand increases above the peak power of the DC source. It is an object of still other embodiments to reduce power dissipation from a single stage of power conversion, while in others an object is to provide flexibility between stand-alone and grid-tie modes of inverter operation.

An object of some other embodiments is to allow power expansion capability through a parallel connection of commercial, off-the-shelf (COTS) DC-DC converters. In other embodiments, an object is to provide an inverter that may be used with a variety of renewable energy sources, such as fuel cells and wind generators. An object of still other embodiments is to prevent a catastrophic short-circuit due to an inadvertent loss of grid-voltage synchronization.

These objects and others are achieved by various forms of the present invention. One form of the present invention provides maximum power tracking and voltage regulation at the output of a solar array, which output is filtered and passed through a DC-DC converter. The DC-DC converter is controlled using one or more control strategies described herein, including feed-forward compensation as a function of array output voltage error, scaled converter output voltage, and the scaled inverse (or square of the scaled inverse) of the RMS value of the output voltage. In preferred forms, systems according to the present invention include over-voltage protection, over-current protection, under-voltage protection, and over-temperature protection as part of the feed-forward compensation loop. In still other forms, emergency or auxiliary loads are switchable into the system, while in still other forms the inverter system is adapted to handle multiple input sources and/or battery back-up.

DESCRIPTION

Figure 1:
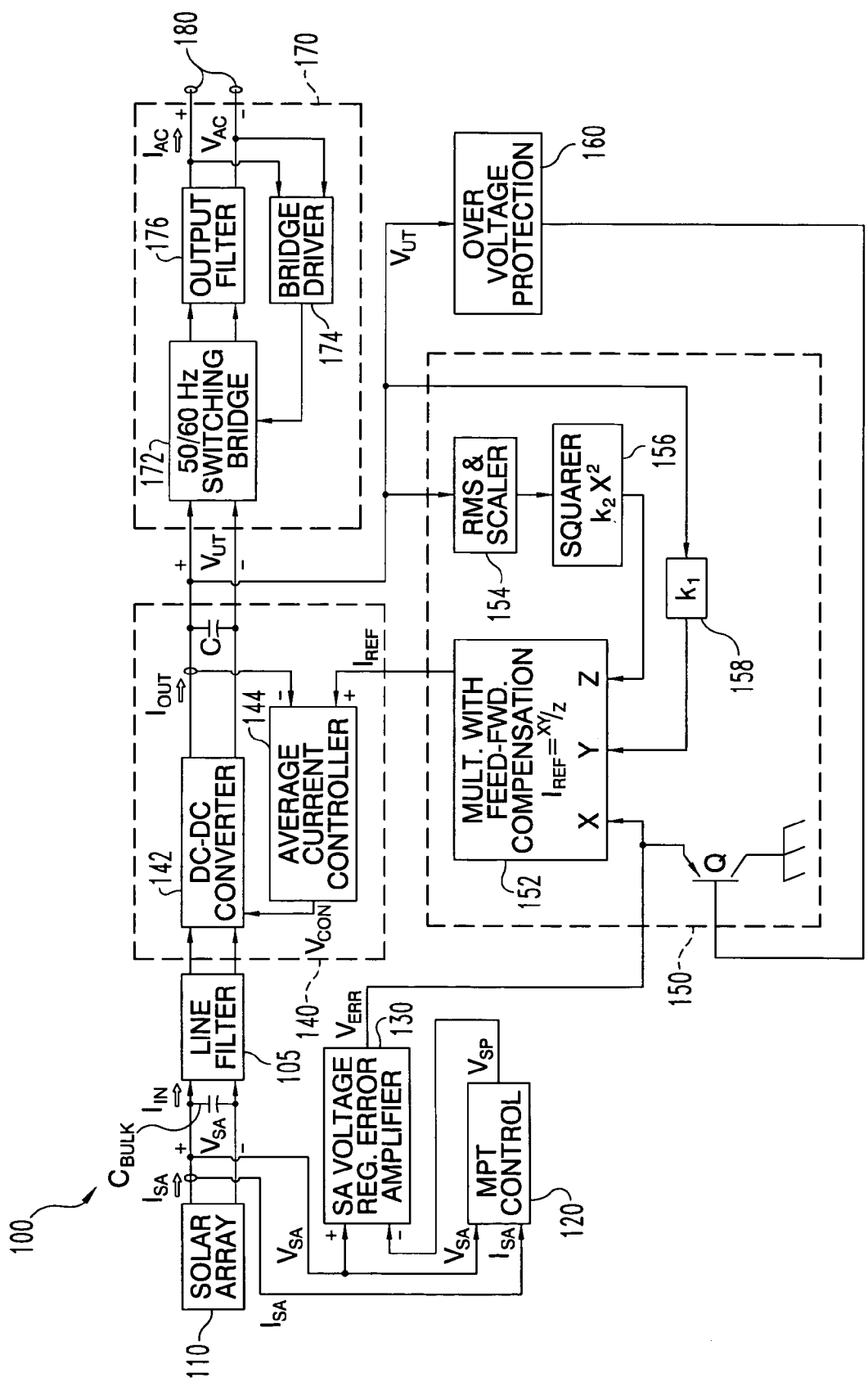
FIG. 1 is a block/schematic diagram of a maximum power tracking solar inverter according to a first embodiment of the present invention.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the inven-

1 Overall System Description

Generally, system 100 adapts the output of a solar array (in this example) or other DC power source for use with the utility power grid, maintaining approximately maximum power output from the source and efficiently transferring that power to the grid. Solar array voltage and power are regulated and converter output current and voltage are controlled. Various exemplary embodiments are described herein, including systems adapted for over-voltage protection, over-current protection, under-voltage protection, over-temperature protection, battery back-up, and multiple inputs. Relevant aspects from these embodiments may be used individually or combined to suit a given situation, as will be understood by those of ordinary skill in the art given the disclosure herein.

Turning to FIG. 1, system 100 adapts the output of solar array 110 for connection to a utility grid at terminals 180. Generally, power flow proceeds along components at the top of FIG. 1, while measurement and control signals and components are shown below the top row of components in the figure. As will be understood by those of ordinary skill in the art, the output current $I_{SA}$ and output voltage $V_{SA}$ of solar array 110 are measured for use at maximum power tracking (MPT) control 120 and solar array voltage regulation error amplifier 130, then filtered by capacitor $C_{BULK}$ and line filter 105. To provide input for current-mode DC-DC converter circuit 140. Feedback and control are provided to converter circuit 140 through the voltage regulation error amplifier 130, compensated current reference generator 150, and over-voltage protection circuit 160. Further details for these subsystems are provided herein. In addition to feedback signals for control purposes, current-mode 140 provides its power output to bridge circuit 170, which supplies the grid through terminals 180.

Employing solar-array voltage $V_{SA}$ and solar-array current $I_{SA}$ as the feedback signals, the MPT control subsystem 120 continuously updates the set-point voltage reference $V_{SP}$. This set-point voltage reference commands the solar-array voltage regulation subsystem (or SA voltage regulation error amplifier) 130 to produce the error voltage drive signal $V_{ERR}$ for regulation of the solar-array voltage, $V_{SA}$, at the level corresponding to $V_{SP}$. Upon reaching a steady state of operation, $V_{SA}$ is controlled to swing back and forth around the peak-power solar array voltage with acceptable ripple voltage at the frequency twice that of the utility frequency. The $V_{ERR}$ signal, which serves as an input-power commanding voltage and is sufficiently band-limited to have negligible AC ripple voltage (especially at twice the utility frequency), commands the compensated current reference generator subsystem 150 to control the converter power stage 140 to properly deliver the output current of the rectified sinusoidal wave, $I_{OUT}$.

Subsequently, the DC-AC switching bridge inverter subsystem 170 provides switching control from bridge driver 174 at the utility frequency to the 50/60 Hz switching bridge 172 that commutates $I_{OUT}$ into an AC current in synchronization with the AC utility voltage. Switching bridge 172 delivers the in-phase AC current $I_{AC}$ to the utility grid through output filter 176 with low total-harmonics distortion, as considered by Songquan Deng, Hong Mao, J. Mazumdar, I. Batarseh, K. K. Islam, "A New Control Scheme for High-Frequency Link Inverter Design," Applied Power Electronics Conference and Exposition, APEC Eighteenth Annual IEEE, Feb. 9–13 2003, Vol. 1, pages 512–517.

When an over-voltage condition is detected from the rectified utility voltage $V_{UT}$, the over-voltage protection subsystem 160 further reduces the error voltage drive signal $V_{ERR}$ through an active pull-down transistor Q. Under this condition, either the absolute average of $V_{UT}$ is regulated at a predetermined level or the power converter is shut down while the absolute average of $V_{UT}$ continues to exceed a predetermined level. For detailed discussions of these strategies, see Kasemsan Siri, Vahe A. Caliskan, C. Q. Lee, "Maximum Power Tracking in Parallel-Connected Converter Systems," IEEE Transactions on Aerospace and Electronics Systems, July 1993, Vol. 29, pages 935–945; and Kasemsan Siri and Kenneth A. Conner, "Fault-Tolerant Scaleable Solar Power Bus Architectures with Maximum Power Tracking," Proceedings of the Sixteenth Annual IEEE APEC, 2001, Vol. 2, pages 1009–1014.

The average-current regulation subsystem (including converter circuit 140 and compensated current reference generator 150) is part of the innermost control loop that requires the fastest control dynamics (or the highest control unity-gain bandwidth) as compared to those of the array-voltage regulation subsystem (120, 130) since the system preferably minimizes harmonic distortion of the rectified sinusoidal current output $I_{OUT}$. See Hong Mao, Jaber Abu-Qahouq, Shiguo Luo, Issa Batarseh, "New Zero-Voltage-Switching Half-Bridge DC-DC Converter and PWM Control Method," Eighteenth Annual IEEE Applied Power Electronics Conference and Exposition, APEC February 2003, Vol. 2, pages 635–640; and Jaber Abu-Qahouq and Issa Batarseh, "Unified Steady-State Analysis of Soft-Switching DC-DC Converters," IEEE Transactions on Power Electronics, September 2002, Vol. 17, No. 5, pages 684–691. Serving as the commanding reference-current signal for the average current regulation subsystem 144, $I_{REF}$ possesses the rectified sinusoidal waveform that is properly scaled from the rectified utility voltage $V_{UT}$.

To significantly reduce the variation of the error voltage $V_{ERR}$ at an array power level within a utility voltage range, a feed-forward compensation technique is utilized to continuously update $I_{REF}$ through the feed-forward compensated multiplier 152 from which the output reference current signal $I_{REF}$ is the scaled product of three quantities: $V_{ERR}$, the instantaneous value of $V_{UT}$ (through scaler 158, which multiplies $V_{UT}$ by $k_1$), and the inverse of the RMS squared value of $V_{UT}$ (i.e., $V_{UT}$ having passed through RMS calculation and scaler 154 and squarer 156).

To provide low total-harmonic distortion in the in-phase AC current $I_{AC}$, $V_{ERR}$ should have negligibly small AC ripple content superimposed on its DC operating point. Therefore, the control loop gain frequency response of the solar-array regulation subsystem needs to have a relatively low unity-gain bandwidth (such as a 10 Hz to 15 Hz bandwidth). Consequently, the array-voltage regulation control loop is preferably designed to be insensitive to the fundamental frequency of the array-voltage AC ripple (at 100/120 Hz) but only to the DC or much lower frequency components of the solar array voltage. See Kasemsan Siri, "Study of System Instability in Current-Mode Converter Power Systems Operating in Solar Array Voltage Regulation Mode," APEC, New Orleans, La., Feb. 6–10, 2000, Vol. 1, pages 228–234; and U.S. Pat. No. 6,009,000 to Kasemsan Siri ("Shared-Bus Current Sharing Parallel Connected Current-Mode DC to DC Converters," issued Dec. 28, 1999). Since the solar array source does not have stiff characteristics of a voltage source, the system requires a proper value of the input filter capacitance $C_{BULK}$ to limit the array voltage ripple (at 100/120 Hz) to an acceptable amplitude (of 5% or less) relative to the array operating voltage. See R. Ramakumar, I. Abouzahr, K. Krishnan, K. Ashenayi, "Twenty-five Design Scenarios for Integrated Renewable Energy Systems, Energy Conversion," IEEE Transactions, December 1995, Vol. 10, Issue 4, pages 736–746; and R. Matson and R. McConnell, "DOE/NREL Fundamental and Exploratory Research Into Solar Cells," Photovoltaic Specialists Conference Record of the Twenty-Ninth IEEE, May 19–24, 2002, pages 1343–1347 for discussion of this design issue.

The compensated current reference generator 150 in this embodiment includes a root-mean-square (RMS) extraction and scaling circuit 154, signal squarer 156, and a three-input multiplier 152. The RMS and scaling circuit 154 extracts a low-pass filtered signal that has a DC component proportional to the RMS value of the utility line voltage $V_{UT}$. The scaled RMS signal preferably has negligible AC components to ensure low harmonic content of the controlled sinusoidal current supplied to the utility grid. The scaled RMS signal is squared by squarer 156, then inverted after being fed to the Z input of the three-input multiplier circuit 152. The inverse squared RMS signal is used as a feed-forward compensation factor, 1/Z, for the three-input multiplier that senses, at the input Y, a scaled (by factor $k_1$ at multiplier 158), rectified utility voltage signal having a rectified sinusoidal wave shape, and multiplies the $V_{ERR}$ signal as input X by the product of the sensed rectified line-voltage signal (Y) and the feed-forward compensation factor (1/Z). The multiplier outputs the computed result (X*Y/Z) as the reference current signal, $I_{REF}$, that commands the average current controller 144 in the innermost control loop to regulate the output current of converter 142 accordingly.

The line-filter 105 interfacing to the array source 110 provides sufficient differential-mode attenuation of line voltage and current ripple at medium and high frequencies as well as common-mode attenuation of the conducted-emission at high frequencies, as discussed in Ramakumar et al., supra. So does the output filter 176, which interfaces to the utility grid. The 50/60 Hz switching bridge 172 is driven by a set of switching signals derived from the utility voltage through the bridge driver circuit 176 such that the resulting AC current $I_{AC}$ that is converted from the converter 142 output current $I_{OUT}$ is always in-phase with the utility voltage.

In some embodiments, transient energy absorption devices are included within either the solar array 110 or the line filter 105 to provide transient voltage suppression from lightning and other induced transients that can be coupled into the solar array and the transmission line being connected between the solar array and the line filter. In other embodiments, the converter 140 output and the DC-to-AC switching bridge inverter subsystem 170 are electrically isolated from the solar array and all the control circuits (120, 130, 144, 150, and 160) by exploiting an isolated-output DC-DC converter 142 and isolated current and voltage sensing schemes for both converter output current $I_{OUT}$ and output voltage $V_{UT}$.

Figure 2:
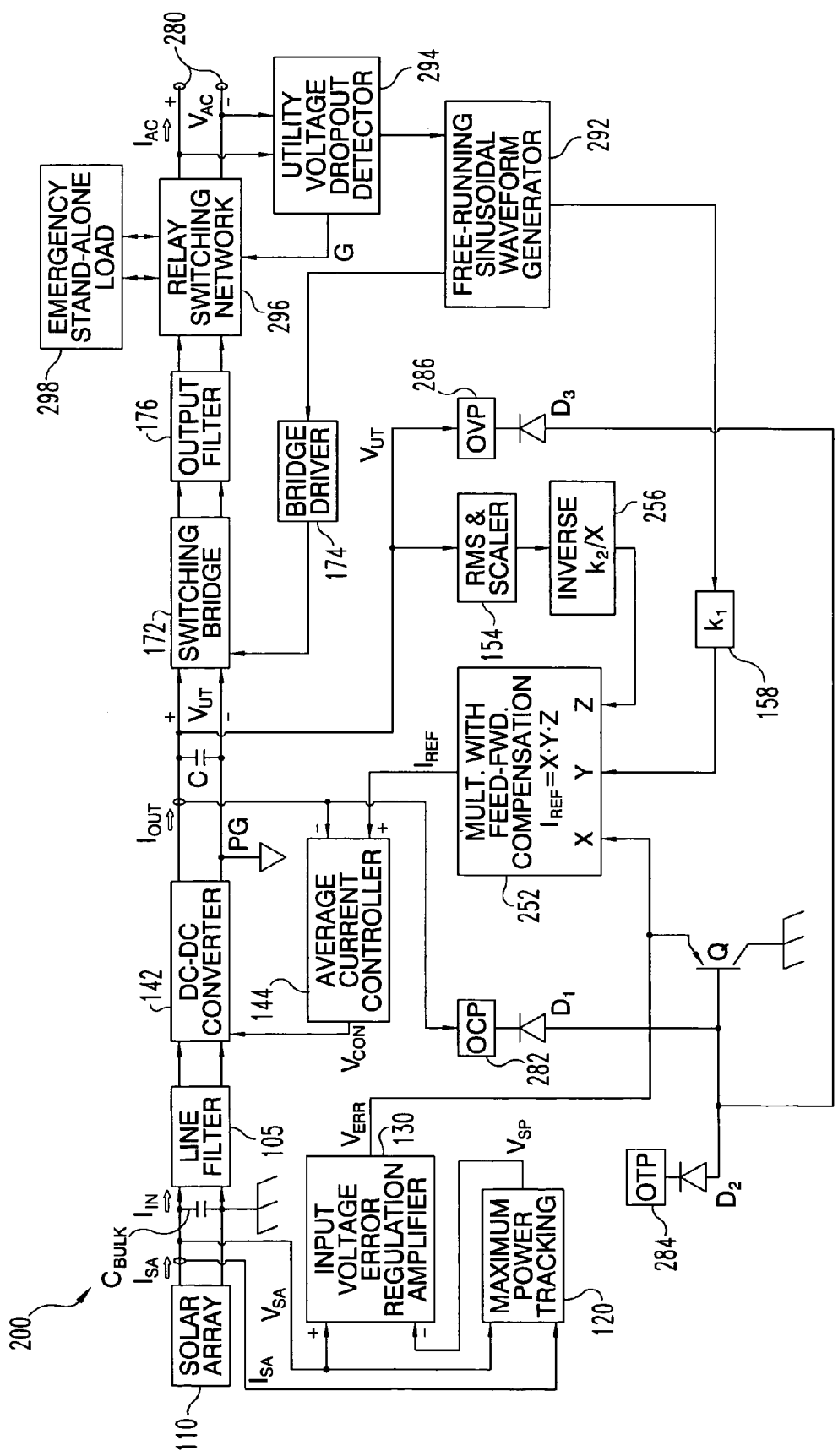
FIG. 2 is a block/schematic diagram of a second embodiment of solar power inverter, with over-voltage, under-voltage, over-current, and over-temperature protection.
Figure 3:
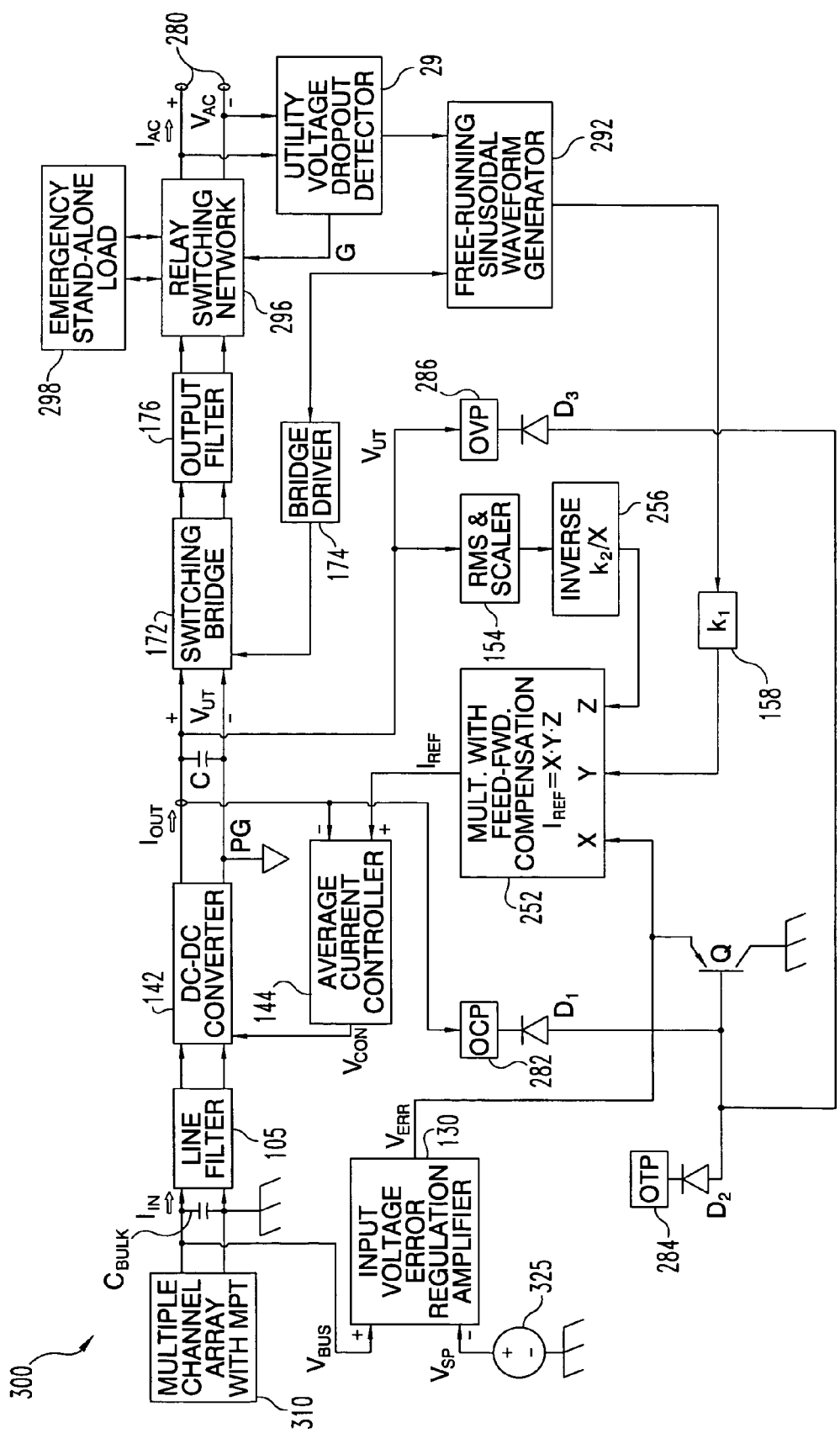
FIG. 3 is a block/schematic diagram of a third embodiment of solar power inverter according to the present invention for use with a multi-channel solar array.
Figure 4:
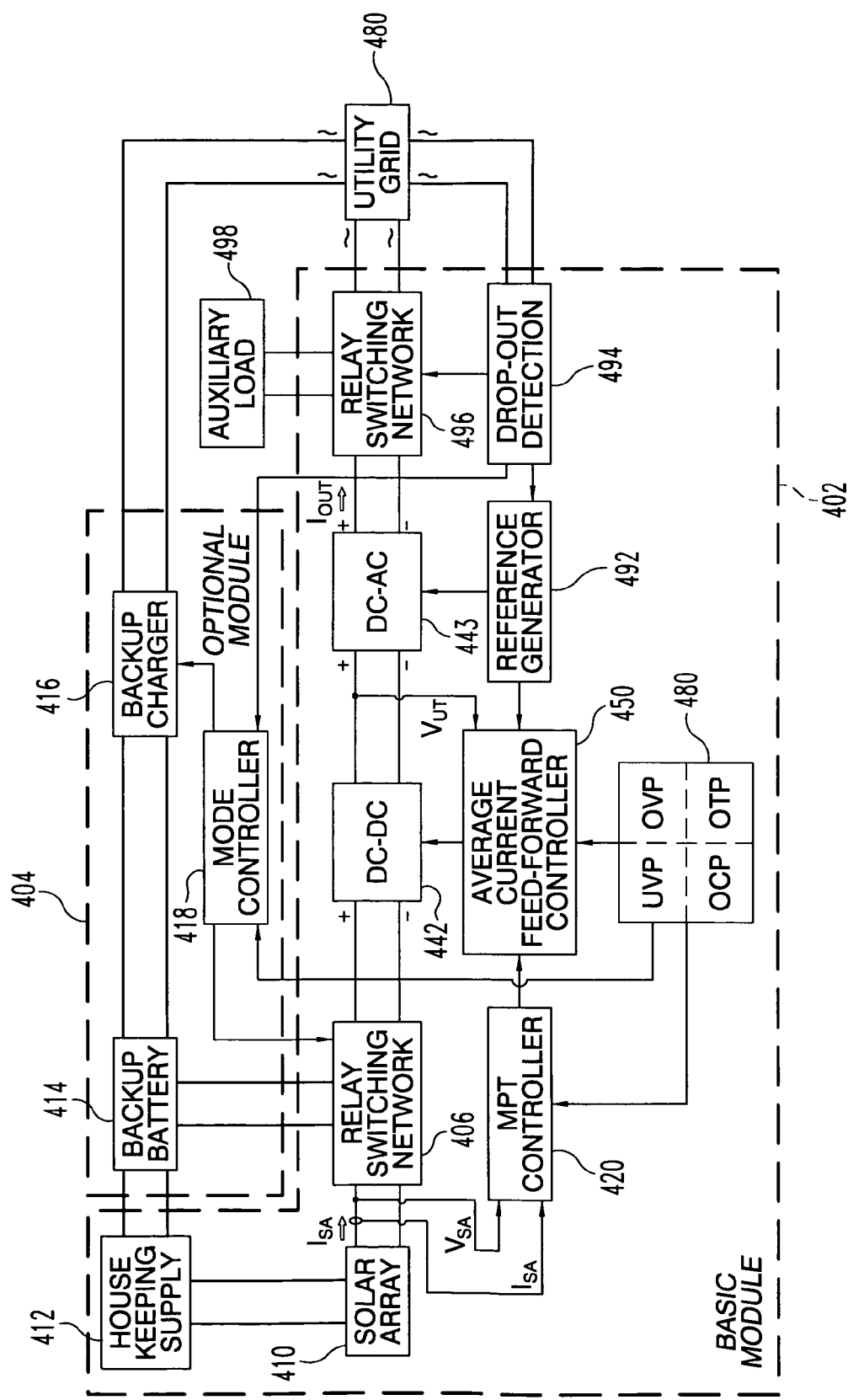
FIG. 4 is a block diagram of a solar inverter with maximum-power tracking and battery back-up.

The basic solar inverter power system can be extended to different architecture and control configurations as shown in FIGS. 2, 3, and 4, where the inverter system controller independently provides the reference sinusoidal signal that can be synchronized with the utility frequency. In this manner, the feed-forward compensation does not need to perform the squarer function to the feed-forward utility voltage. The feed-forward compensation design is therefore simpler, where 1/x is used instead of $1/x^2$ to perform feed-forward compensation (as x represents the utility voltage feed-forward signal $V_{UT}$). As shown in FIG. 2, multiplier with feed-forward compensator 252 provides the product $I_{REF}$ of its three inputs. In this case, the first input is again the amplified input voltage error signal $V_{ERR}$, which is drawn low via pull-down transistor Q if failure conditions are detected by over-current protection circuit 282, over-temperature protection circuit 284, or over-voltage protection circuit 286. These protection circuits provide low-voltage output during a failure through their respective diodes D1, D2, and D3 to pull the gate of transistor Q low, which brings the "X" input of multiplier 252 to a low or zero value.

The second input to multiplier 252, which input has a rectified sinusoidal waveform, is drawn from free-running sinusoidal wave form generator 292, scaled by factor $K_1$ by scaler 158. As discussed just above, the third (Z) input to multiplier 252 is the RMS utility voltage calculated by RMS unit 154, as inverted by inverter 256. The product, $I_{REF}$, provides reference current to average current controller 144, as discussed above, in relation to FIG. 1.

Free-running sinusoidal reference generator mode 292 is, in some embodiments, an analog-filter sinusoidal waveform generator circuit that accepts a square-wave signal input and produces the in-phase sinusoidal output at the same frequency of the square-wave input, as will be understood by those skilled in the art. The square-wave input always has a fixed amplitude and is derived from the AC utility grid voltage through a zero-crossing detector circuit that detects zero-voltage crossing of the utility grid voltage without being sensitive to the amplitude of the utility grid voltage, but only to the timing of the utility grid voltage zero-crossings. The zero-voltage crossing detector is preferably a voltage comparator that provides a bipolar output voltage waveform of fixed amplitude.

Free-running sinusoidal generator 292 also provides a square-wave control input to bridge driver 174, which again controls the switching bridge 172. The output of switching bridge 172 passes through output filter 176 to relay switching network 296. Relay switching network 296 chooses between outputs to the grid via terminals 280 and the emergency stand-alone load 298 based on the output control signal G from utility voltage drop-out detector 294. The control signal G delivers one of two possible control states: grid-tie state or stand-alone state. Design and construction of these components is within the capability of one of the ordinary skill in the art based on the present disclosure, and will not be described further herein.

FIG. 3 provides the solar inverter power system that regulates its DC input voltage to a corresponding set-point voltage $V_{SP}$, selected by voltage source 325. MPT control (as in subsystem 120 of FIG. 1) is unnecessary in this embodiment since the upstream distributed solar array power systems 310 already achieve MPT through their individual MPT controllers. The remainder of the embodiments shown in FIG. 3 operate substantially as discussed above in relation to the embodiments shown in FIG. 2.

Figure 25:
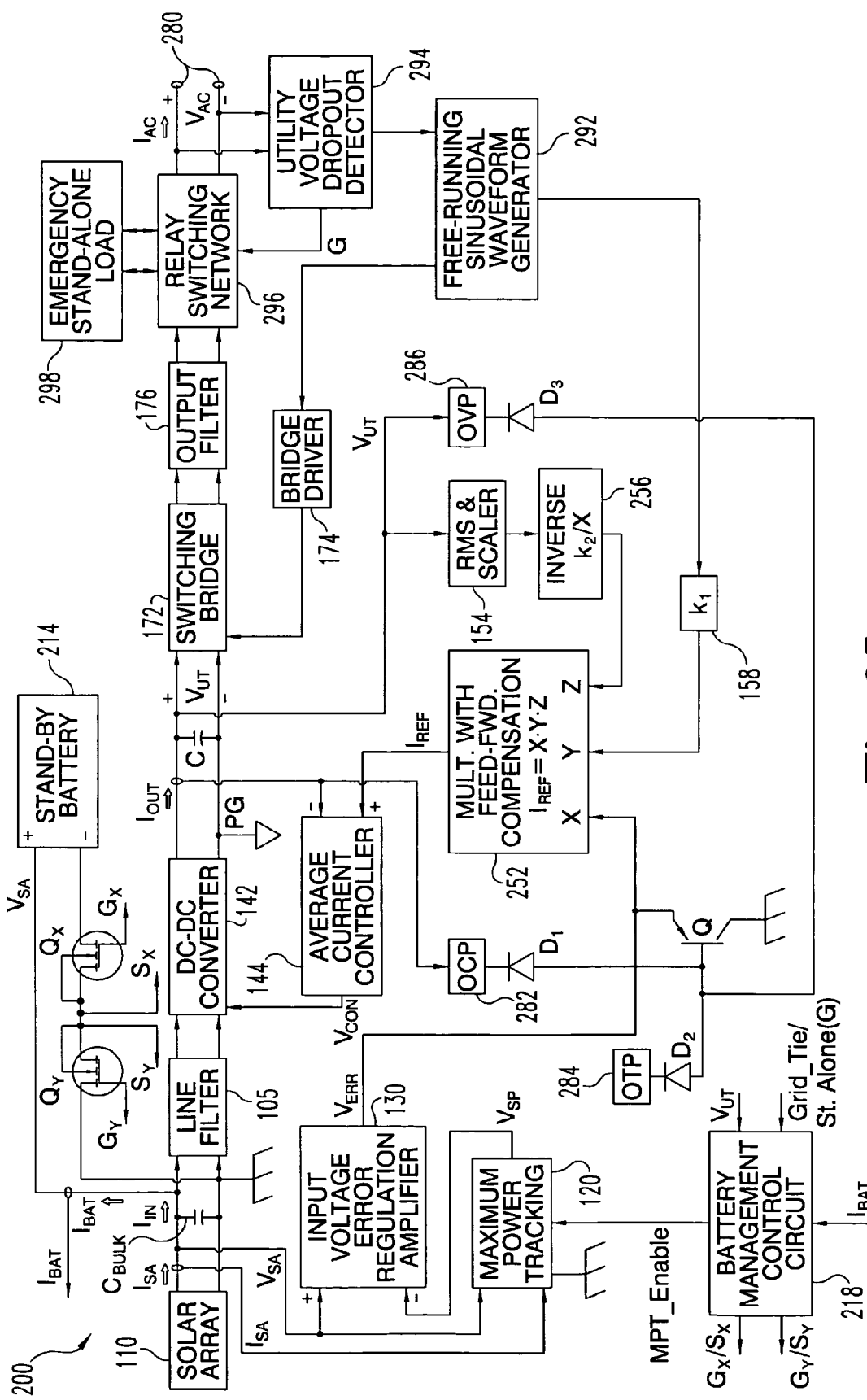
FIG. 25 is a block/schematic diagram of a maximum power tracking solar inverter with a stand-by battery and emergency stand-alone load according to a second embodiment of the present invention.

FIG. 25 shows an inverter system similar to that in FIG. 2, but with the addition of a stand-by battery to improve performance during high transient surges in the power demanded by the stand-alone load that sometimes require a start-up current significantly above the steady-stage current. In some applications of the embodiment shown in FIG. 2, the system has not been able to bring the stand-alone load to its typical steady state because the start-up load power was much higher than the array peak power, subsequently leading to a lock-up state wherein the load RMS voltage is too low for proper operation. The stand-by battery added in the embodiment shown in FIG. 25 has active controlled switches $Q_X$ and $Q_Y$ providing a solution that allows high power surges during the start-up of the stand-alone load to quickly bring the load voltage and power to reach its steady-state operating condition. In the embodiment being discussed, $Q_X$ and $Q_Y$ are N-channel enhancement MOSFETs that have built-in body diodes. Other switches are used in alternative embodiments, as would be understood by those skilled in the art.

Electrical isolation between the converter output and the remaining control circuits, including the solar array, the line-filter, the stand-by battery, and the converter input, is achievable through isolation schemes within the following subsystems shown in FIGS. 2, 3, and 25: (1) DC-DC converter 142 through its internal isolation transformer, (2) bridge driver circuit 174 through its isolated driving transformer or opto-isolated driving circuit, (3) utility voltage dropout detector 194 through its voltage-sense transformer, (4) the sensed converter output current $I_{OUT}$ through an isolated current sense scheme such as a current-sense transformer, and (5) the sensed converter output voltage $V_{UT}$ through an isolated voltage sensing scheme such as an opto-isolated voltage sensing circuit.

The battery management control circuit 218 detects the under-voltage condition of the load voltage $V_{UT}$ when the system operates in stand-alone mode. Such an under-voltage condition occurs as a consequence of a high start-up load current, causing the control circuit to disable MPT controller 120 by changing the MPT_Enable signal to be inactive for a predetermined duration. The inactive state of MPT_Enable immediately resets the commanding set-point $V_{SP}$ to its preset minimum level, allowing the DC-DC converter 142 to absorb more input current to which both the stand-by battery and the array source can contribute. Once the load demand reaches steady state, the transient under-voltage condition disappears and the MPT controller 120 resumes its active function to bring the array voltage $V_{SA}$ into at least its peak power voltage. During steady state of the stand-alone mode of operation, the healthy solar array voltage is typically greater than the battery voltage, so MOSFETs $Q_X$ and $Q_Y$ are turned off, resulting in no power drain from the stand-by battery. During the absence of sunlight when the inverter is in stand-alone mode, the array source is inactive, subsequently causing MPT_Enable signal to be inactive, thereby disabling MPT controller 120 and setting $V_{SP}$ to the minimum. At the same time, MOSFET $Q_Y$ is turned on to allow the stand-by battery to provide power to the stand-alone load due to the natural conduction of the body diode within MOSFET $Q_X$. During the period in which the MPT controller 120 is disabled, the load voltage $V_{UT}$ may increase until it reaches the over-voltage protection threshold, where the OVP and circuit 286 will actively regulate the RMS output voltage of the converter power stage 142 to ensure a safe operating condition.

Once the period expires in which MPT operation is disabled, MPT operation is resumed while the battery is still in stand-by mode (MOSFET $Q_X$ is off and MOSFET $Q_Y$ is on). Therefore, the MPT commanding set-point voltage $V_{SP}$ increases from its minimum value, and consequently the converter input voltage increases toward the maximum power voltage. Due to the reverse bias across the body diode within MOSFET $Q_X$ while $Q_Y$ may remain turned on, the stand-by battery 214 will stop transferring its power. Nonetheless, both MOSFETs $Q_X$ and $Q_Y$ may be turned off to ensure battery energy conservation. During steady-state operation of stand-alone load or grid tie, the stand-by battery 214 may be charged at a slow rate, while $Q_Y$ is turned off, by controlling $Q_X$ to be in a linear region of MOSFETs characteristics as summarized in Table 1. For a much faster rate of battery charging, $Q_X$ can be turned on continuously or operated in a linear PWM mode that allows the charging current to be regulated by the linear control of the $Q_X$ MOSFET which is periodically turned off to control thermal stresses around $Q_X$ and maintain the battery in a safe operating condition. Furthermore, during an inverter shut-down mode of operation, the stand-by battery 214 may be charged at the faster rate to quickly restore its healthy state of charge.

TABLE 1

| Battery Mode | State of Qx | State of Qy | Inverter Mode | State of MPT Controller | State of Array Source | Benefits |
| --- | --- | --- | --- | --- | --- | --- |
| Isolation | OFF | OFF | Shut-down | Stand-by | Inactive | Conserve battery energy |
| Stand-By | OFF | ON | GT or STA | Active | Active | |
| | | | STA | Active | Active | For $V_{SA} > V_{BAT}$, transfer array peak power to STA load & conserve battery |
| | | | STA | Disable | Inactive or weak | Battery power for load voltage regulation, MPT set $V_{SP}$ = minimum |
| Charging | Linear Regulated | OFF | GT or STA | Active | Active | Maintain healthy state of charge at low power while tracking array peak power to grid or stand-alone load |
| Input Voltage Clamping | ON or Linear PWM | OFF | Shut-Down | Stand-by | Active | Fast battery charging to restore healthy state of charge No power transfer to inverter |
| Battery Dominated Input | ON | ON | STA | Disable | Inactive | Low-loss power transfer to stand-alone load with voltage regulation, MPT set $V_{SP}$ = minimum |
| | ON or Linear PWM | ON | Shut-Down | Stand-by | Active | Fast battery charging to restore healthy state of charge No power transfer to inverter |

FIG. 4 provides a system level application interconnected configuration that allows either grid-tie or stand-alone operation to take place through a relay-switching network 496 interfacing between the utility grid 480 and the inverter output line filter. Through the front-end relay-switching network 406 interfacing between the solar array 410, the back-up battery 414, and the power input port of DC-DC converter 442, the inverter system also autonomously operates in either normal MPT or battery back-up mode depending on the health status of the utility grid voltage and the inverter output voltage/current. When the utility grid is in either an over- or under- voltage condition, the system transfers the solar power to the stand-alone load (or auxiliary load) 498 instead. In this stand-alone mode, the reference sinusoidal signal from reference generator 492 does not need to be synchronized with the utility grid voltage, and neither does the inverter output voltage across the stand-alone load 498, which in most cases serves emergency purposes such as emergency lighting. As shown in FIG. 4, a battery charger 416 is part of an optional back-up subsystem 404 that can be added to the basic module 402 if superior battery reliability is desired. This exemplary architecture offers the full utilization of the single stage of power conversion (DC-DC converter 142) for all modes of operation. The DC-DC converter 442 can also consist of either a single module or parallel-connected converter modules that allows for expansion for higher power capability. Under/over inverter output voltage (UVP & OVP) protection, inverter output over-current protection (OCP), and inverter over-temperature protection (OTP) can be inserted at 480 similarly to that protection shown in FIG. 3.

Through computer simulations discussed below, a new control approach for a solar-based inverter that tracks the maximum available power and produces a near-unity power factor was validated. It is shown that the systems described herein produce excellent signal-to-noise ratios for the feedback signals, ensuring reliable and robust tracking of maximum power while tightly regulating the sinusoidal waveform of AC current supplied to the utility grid with almost unity power factor. It is also shown that using feed-forward compensation coupled with single-stage DC-DC conversion, the proposed inverter system is simplified when compared to many conventional inverter designs. This is still achieved while maximum power is being drawn from the solar array.

2 Subsystem Descriptions

Figure 5:
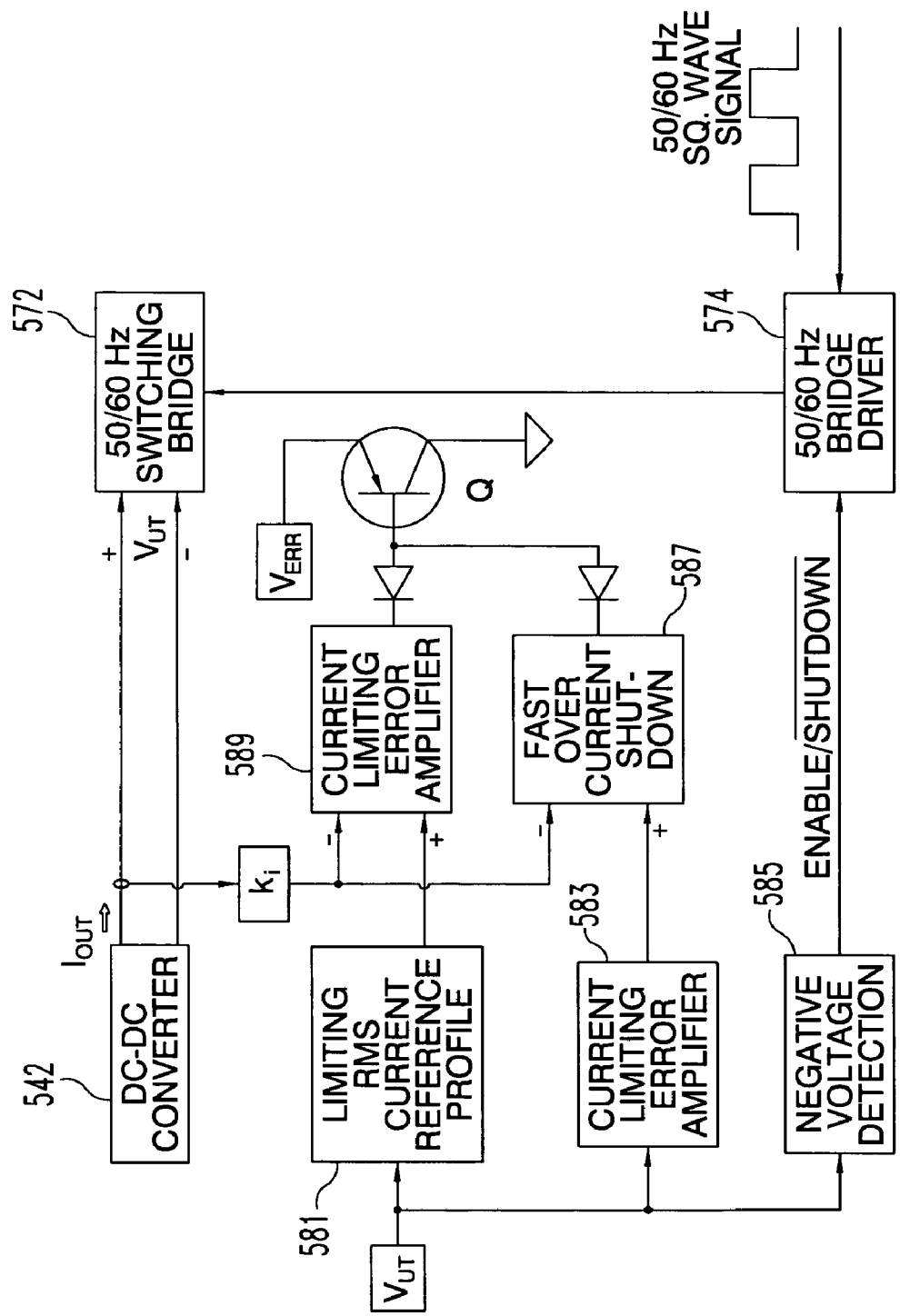
FIG. 5 is a block diagram of an over-current protection controller for use in various embodiments with the present invention.
Figure 8:
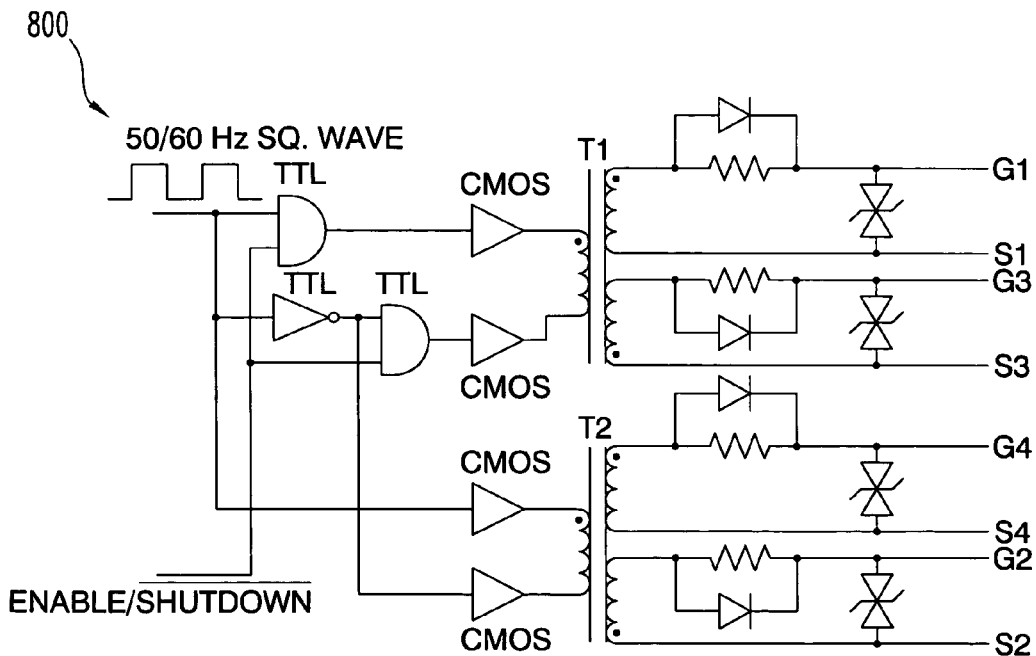
FIG. 8 is a schematic diagram of a 50/60 Hz bridge driver circuit for use in various embodiments of the present invention.

FIG. 5 shows additional detail of an OCP circuit 500 for use in various embodiments of the present invention (for example, as circuit 282 in FIGS. 2, 3, and 25), including three over-current protection functions: (1) slow current limiting, (2) fast over-current regulation, and (3) prevention of current run-away due to unexpected negative rectified utility voltage $V_{UT}$ that occurs as a result of loss of synchronization. For slow current-limiting function, the inverter RMS output current is controlled to not exceed its RMS reference limit, which is a function of the rectified utility voltage as determined at 581. The circuit block depicted as "limiting RMS current reference profile" 581 produces the RMS current limiting set-point, $I_{Lim\_ref}$, which commands the current-limiting error amplifier 589 to limit the output current to a corresponding RMS value. This slow current-limiting function preserves the sinusoidal waveform of the inverter output current since its control loop unity gain bandwidth is only 12 Hz to 15 Hz. The fast over-current shut-down circuit 587 provides an immediate reduction of the inverter output current when an over-current transient condition occurs that is considered unsafe to the inverter operation. The fast over-current regulator quickly limits the inverter output current to an instantaneous level corresponding to the fast current reference set-point $I_{Fast\_ref}$ which is determined by fast current command reference 583. The current level corresponding to $I_{Fast\_ref}$ can be considered as the upper ceiling limit that already above the sinusoidal steady state output current delivered during the slow current-limiting operation. Finally, a shut-down signal may be produced by negative voltage detection circuit 585 from the utility voltage $V_{UT}$ when its negative voltage is present across the DC-DC converter output to prevent a run-away of the inverter output current. To effectively prevent the inverter current run-away, the 50/60 Hz switching bridge circuit 572 needs to be shut-down through the enable input of the 50/60 Hz bridge driver circuit 574 that is also shown in FIG. 8, below.

Figure 6:
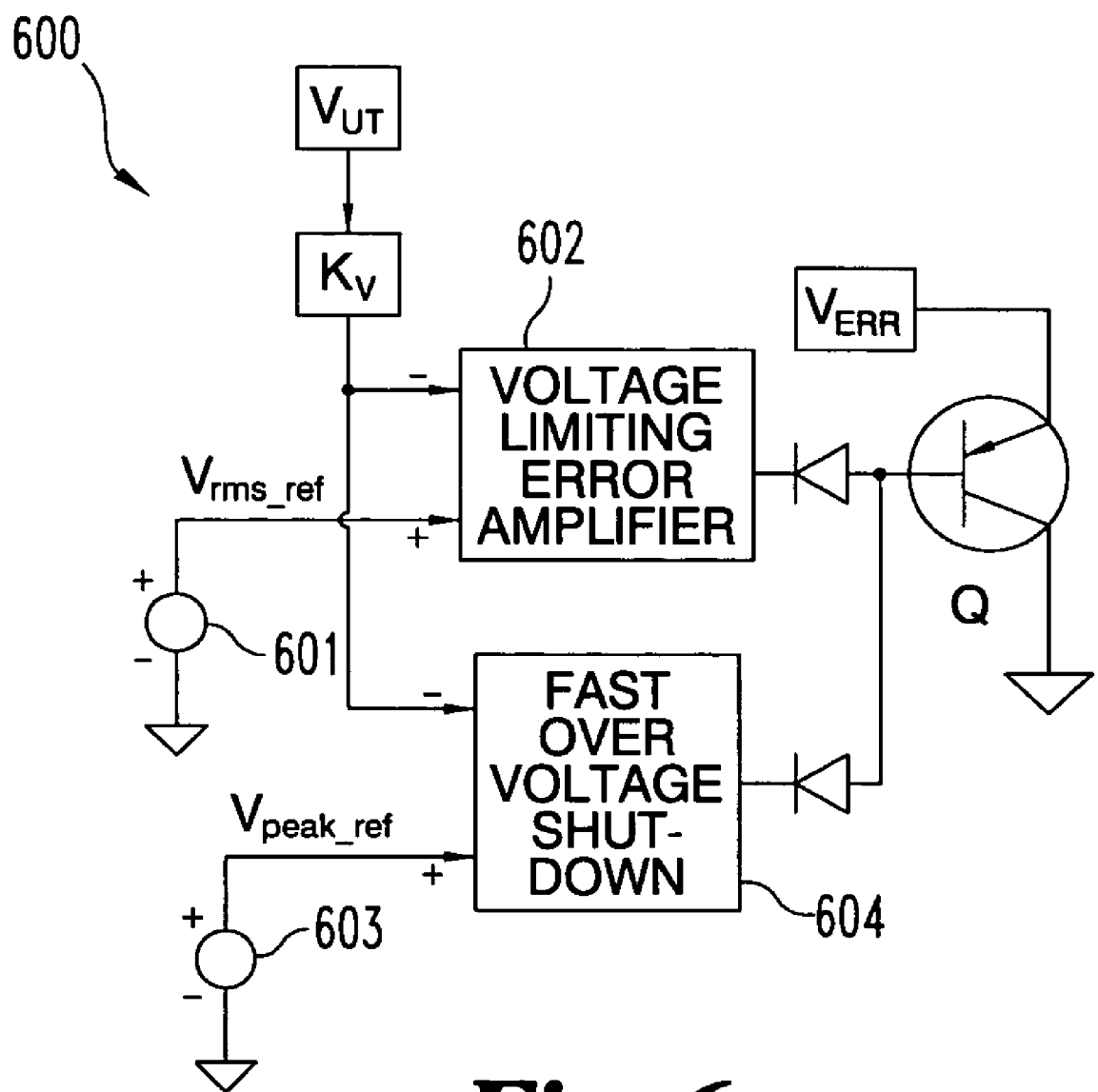
FIG. 6 is a block diagram of an over-voltage protection controller for use in various embodiments with the present invention.

FIG. 6 reveals more detail of the OVP circuit 600, which provides two over-voltage protection functions: (1) slow voltage-limiting, and (2) fast over-voltage regulation. For slow over-voltage-limiting function, the inverter RMS output voltage is controlled to not exceed its RMS reference limit $V_{RMS\_ref}$ which is provided by voltage source 601. That signal commands the over-voltage-limiting error amplifier 602 to limit the output voltage to a corresponding RMS value. This slow over-voltage limiting function still preserves the sinusoidal waveform of the inverter output current since its control loop unity gain bandwidth is only 12 Hz to 15 Hz. The fast over-voltage shut-down circuit 604 provides an immediate reduction of the inverter output current when an over-voltage transient condition that is considered unsafe to the inverter operation occurs (relative to potential $V_{Peak\_ref}$ from voltage source 603).

In some embodiments, both current and voltage sensing schemes are implemented with electrical isolation from the converter output, though circuit detail for the isolated sensing of the converter output current $I_{OUT}$ and output voltage $V_{UT}$ is omitted from FIGS. 5 and 6. Given this direction, use of isolated sensing schemes is within the skill of the ordinary artisan.

Figure 7:
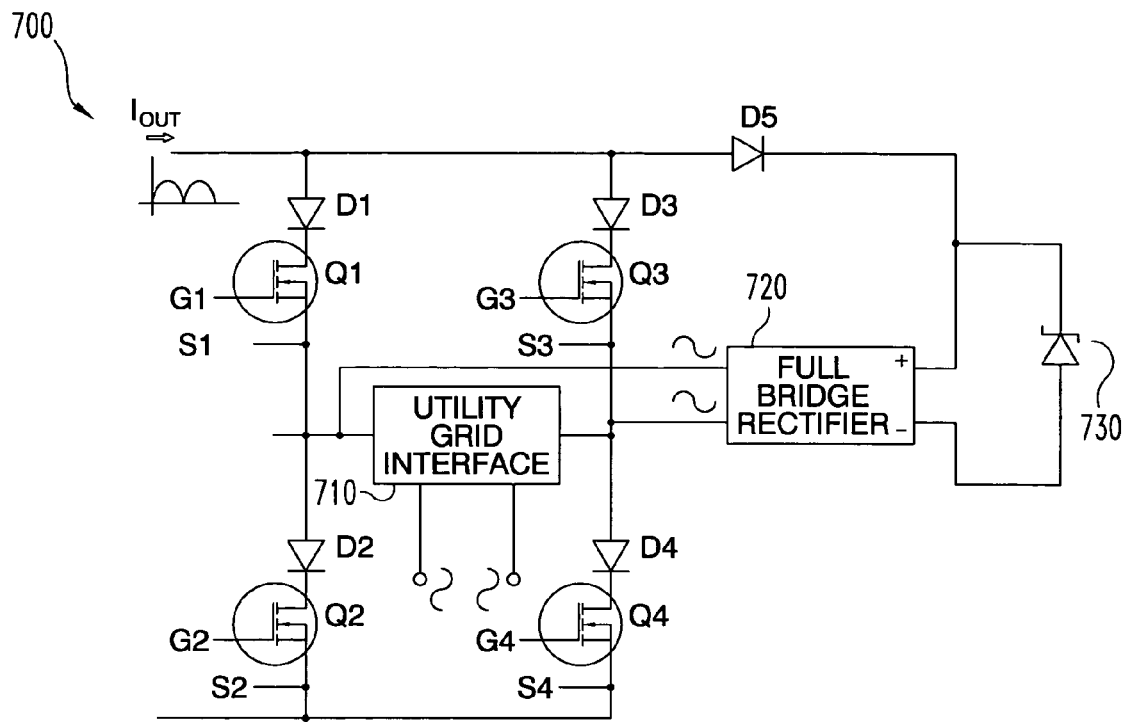
FIG. 7 is a schematic diagram of a 50/60 Hz switching bridge circuit for use in various embodiments of the present invention.

FIG. 7 shows the 50/60 Hz switching bridge circuit 700 that performs commutation of the unidirectional output current $I_{OUT}$ of the DC-DC converter in some embodiments of the present invention to get a bi-directional sinusoidal AC current for injecting into the utility grid through the utility grid interface circuit 710, which in some embodiments includes an output filter, a fuse, and an output relay-switching network. MOSFETs Q1 and Q4 are switched in complement with MOSFETs Q2 and Q3 with 50% duty cycle. A slightly overlapped on-time is allowed between these two pairs of MOSFETs to ensure that the sourcing current from the DC-DC converter output always observes low impedance during any commutation transition, thereby preventing harmful voltage spikes from happening during any commutation instant.

During a threat of an over-current run-away induced by an unexpected negative voltage appearing across the DC-DC converter output, the 50/60 Hz switching bridge may be shut down by the deactivated enable signal (see FIG. 8) that turns off the upper MOSFETs Q1 and Q3 to interrupt the inverter connection to the utility grid voltage (see FIG. 8 and accompanying discussion). During the severe circumstance of the switching bridge shut-down, the residual inductive kick-back energy from the DC-DC converter output is released through the transient absorption circuit consisting of D5, a full-bridge rectifier 720, and a set of transient absorption (e.g., TRANZORB) or over-voltage protection devices 730 as shown in FIG. 7.

Consequently, the 50/60 Hz switching bridge circuit 700 shown in FIG. 7 is universally applicable to any DC-DC converter topology that is capable of delivering continuous current from its output without needing to have a filtering capacitor across its output. For some converter topologies, it is still possible to have a DC-DC converter that delivers discontinuous current from its output and at the same time the unidirectional discontinuous current is injected into the switching bridge circuit for production of bi-directional discontinuous current supplying the utility grid via a properly designed output filter that is capable of removing most of the switching ripple out of trains of the pulsating current waveform and finally delivering continuous AC current to the utility grid.

FIG. 8 provides the detail of the 50/60 Hz bridge driver circuit 800 that feeds four driving signals to the four MOSFETs Q1 to Q4 in the switching bridge commutation network as shown in FIG. 7. The driving transformers T1 and T2 provide necessary electrical isolation among the four ports that deliver output driving signals (G1/S1, G2/S2, G3/S3, and G4/S4). Four sets of interconnected resistor and diode networks interfacing between the secondary winding outputs of the two transformers and the four driven gate-source terminal pairs ensure that, during every transition of inverter current commutation, acceptable but negligible overlapped on-time exists between the upper and lower MOSFETs in the switching bridge circuit.

Figure 9:
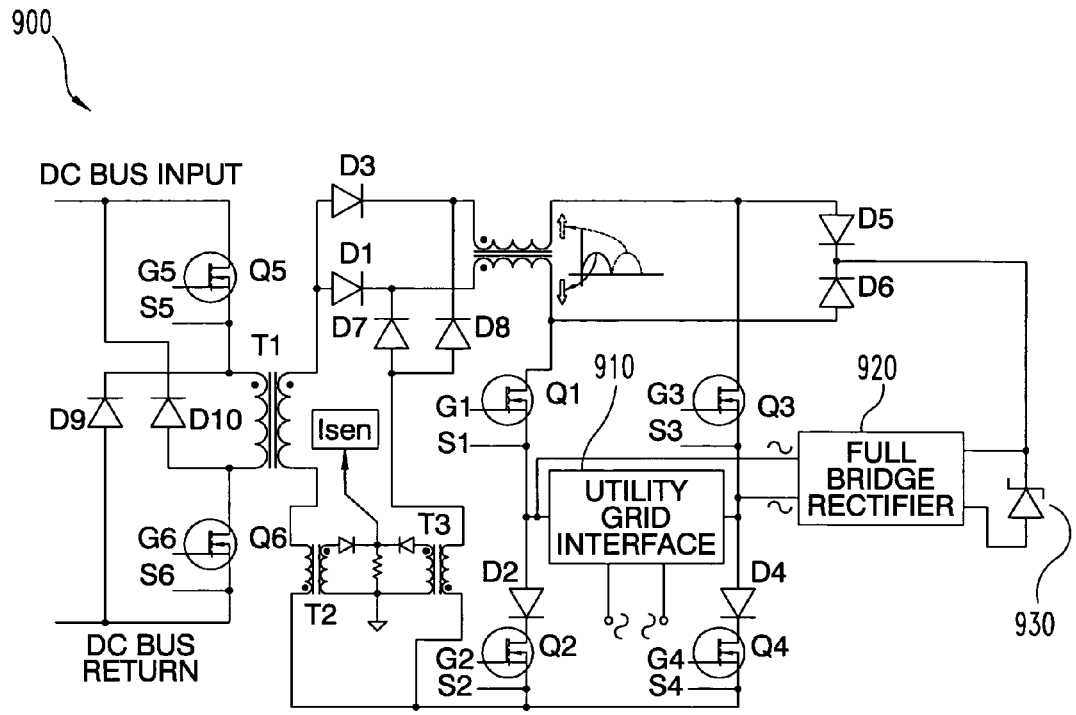
FIG. 9 is a schematic diagram of a combined DC-DC converter and switching bridge circuit for use in various embodiments of the present invention.

A DC-DC converter power stage and a 50/60 Hz switching bridge circuit can be combined together to form subsystem 900 as shown in FIG. 9 to reduce the forward voltage drops of the power rectifiers. At the same time, these combined power circuits employ transformer T1 to provide electrical isolation from the upstream DC power system without losing the transient absorption capability. To significantly reduce loss from resistive current sensing schemes, and to provide isolation of the sensed current signal from the power circuit, a current-transformer sensing scheme is used instead through current-sense transformers T2 and T3 to obtain the isolated sensed current signal Isen for feedback control purposes. Coupled inductor L1 allows commutation of the unidirectional converter output current into the AC current supplying the utility grid interface circuit 910. At the same time, this design reduces the forward voltage drop to only two diodes, instead of the three-diode voltage drops found in many conventional single-winding inductors.

The preferred combined power and switching bridge circuit 900 contains an optimum number of active switches (six) for reliable and efficient power conversion, while retaining effective commutation of the converter output current. The same bridge driver circuit 800 shown in FIG. 8 is still applicable for controlling the four commutating power MOSFETs (Q1 to Q4) shown in FIG. 9. Only Q5 and Q6 are switched and pulse-width modulated at high frequency in tandem to regulate the converter output current in a rectified sinusoidal waveform. Diodes D2 and D4 protect against an inadvertent short-circuit across non-zero utility grid voltage since these two diodes prevent their respective power MOSFETs from conducting through their respective body diodes. Such a potentially catastrophic short-circuit could occur as a result of an inadvertent or temporary loss of grid-voltage synchronization of driving signals produced by the 50/60 Hz bridge driver circuit.

Figure 24:
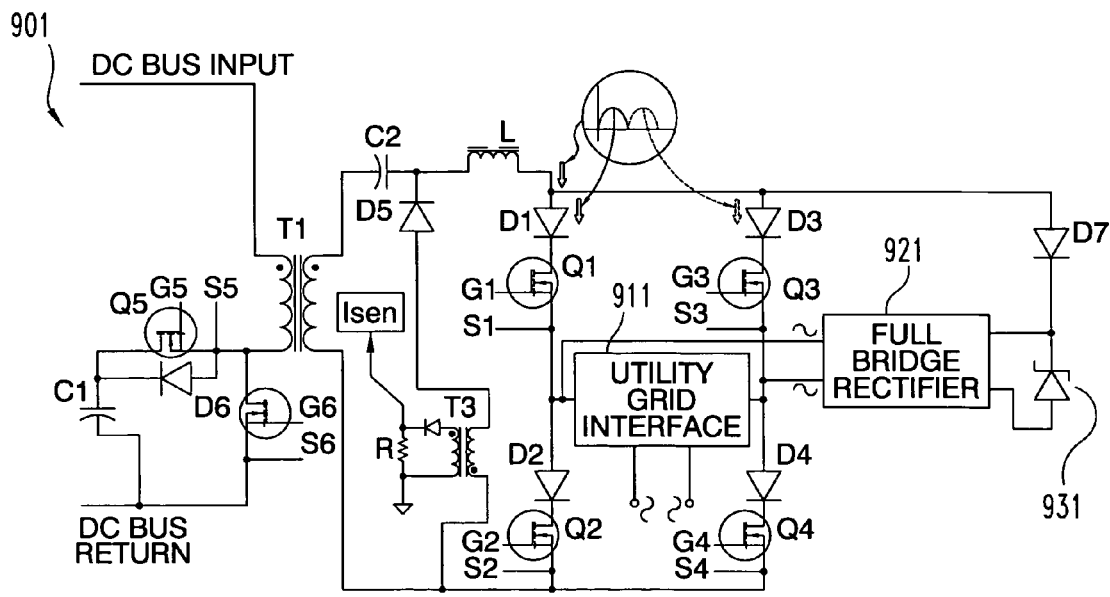
FIG. 24 is a schematic diagram of a combined DC-DC converter and switching bridge circuit for use in various embodiments of the present invention.

Another DC-DC converter power stage and a 50/60 Hz switching bridge circuit can be combined together to form subsystem 901 as shown in FIG. 24 to reduce the forward voltage drops of the power rectifiers. At the same time, these combined power circuits employ transformer T1 to provide electrical isolation from the upstream DC power system without losing the transient absorption capability. To significantly reduce loss occurring from resistive current sensing schemes, and to provide isolation of the sensed current signal from the power circuit, a current-transformer sensing scheme is preferably used instead. In this exemplary embodiment, current-sense transformer T3 obtains the isolated sensed current signal Isen for feedback control purposes. In subsystem 901, T1 serves two functions simultaneously: as energy storage through its magnetizing inductance, and as a transformer for immediate transfer of energy stored in capacitor C2 and energy from the DC input bus into inductor L and downstream circuitry.

Despite its highly pulsating wave shape, Isen has the same moving average value as the current through inductor L. Therefore, Isen can be controlled to have its moving average tracking a rectified sinusoidal wave shape while forward voltage drops of only two diodes are still achieved. The combined power and switching bridge circuit 901 also contains an optimum number of active switches (six) for reliable and efficient power conversion while retaining effective commutation of the converter output current.

The same bridge driver circuit shown in FIG. 8 is still applicable for controlling the four commutating power MOSFETs (Q1 to Q4) shown in FIG. 24. Only Q5 and Q6 are always switched in a complementary fashion (non-overlapping on-time between Q5 and Q6), while Q6 is pulse-width modulated at high frequency to regulate the converter output current in a rectified sinusoidal waveform. C1, Q5, and D6 provide an active voltage clamping mechanism to absorb parasitic energy stored in the leakage inductance of transformer T1, while at the same time releasing the excess transient energy to the output capacitor C2 through diode D5 during every on-time interval of Q5. D6 provides an immediate voltage clamping path due to residual current in the T1 leakage inductance at every turn-off interval of Q6; therefore, Q5 does not need to be exactly switched in a perfect complementary fashion with Q6. Diodes D2 and D4 provide an inadvertent short-circuit protection across non-zero utility grid voltage since these two diodes prevent their respective power MOSFETs Q2 and Q4 from conducting through their respective body diodes. In the same manner, diodes D1 and D3 prevent inadvertent conduction of the body diodes in MOSFETs Q1 and Q3, respectively.

Figure 10:
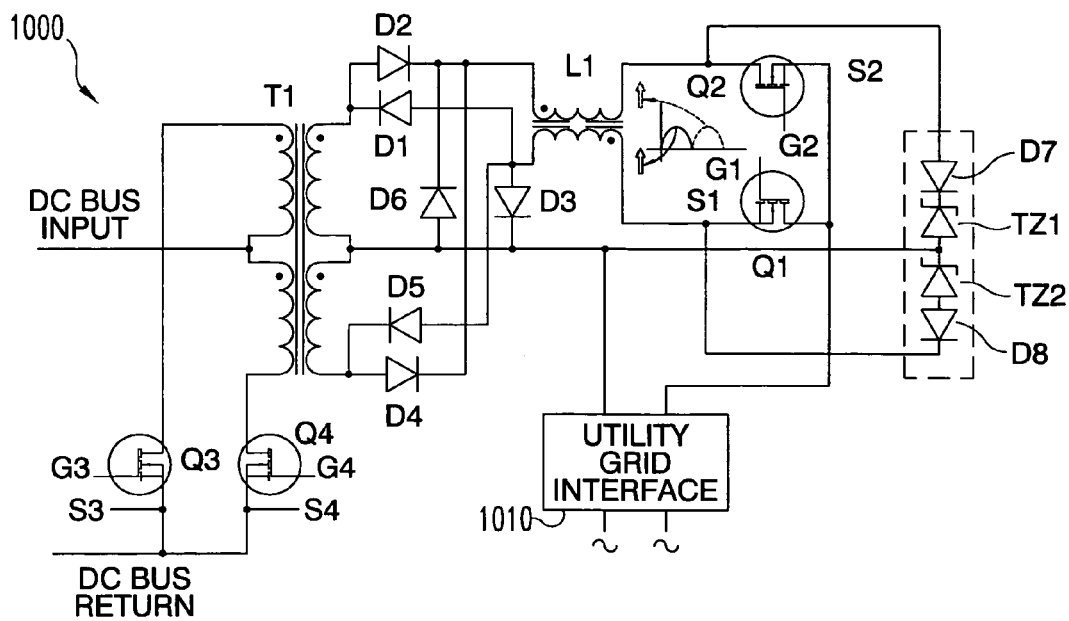
FIG. 10 is a schematic diagram of a push-pull DC-DC converter combined with a 50/60 Hz unfolding network for use in various embodiments of the present invention.

FIG. 10 illustrates a power circuit 1000 that minimizes the forward voltage drops of the power rectifiers. This configuration consists of a push-pull DC-DC converter power stage and a 50/60 Hz unfolding circuit. At the same time, the combined power circuit 1000 employs a high-switching-frequency transformer T1 for providing electrical isolation from the upstream DC power system without losing the transient absorption capability. Center-taps are provided for both primary and secondary windings of transformer T1 that allow MOSFETs Q3 and Q4 to be switched in a symmetrical pulse-width modulated push-pull fashion and a full-wave rectification of the converter output current with only one forward diode voltage drop. The centered-tap secondary windings of transformer T1 and coupled inductor L1 allow commutation of the unidirectional converter output currents into continuous AC current supplying the utility grid interface circuit 1010 and at the same time further reducing the forward rectification voltage drop of only one diode. As a result, the dual centered-tap push-pull configuration produces one less diode voltage drop as compared to the combined power circuit configuration shown in FIG. 9. The combined power converter and 50/60 Hz unfolding network contains a minimal number of active switches (four switches) for reliable and efficient power conversion, while retaining effective commutation of the converter output current.

MOSFETs Q1 and Q2 of the unfolding network are switched in a complimentary fashion at the utility (50/60 Hz) frequency to alternately supply the converter's positive and negative currents to the utility grid. Q3 and Q4 are switched and pulse-width modulated at high frequency in an interleaving non-overlapped ON-time manner so as to regulate the converter output currents to be rectified sinusoidal waveform. Two sets of transient absorption circuits (one consisting of D7 and TZ1 and the other D8 and TZ2) provide transient energy absorption from transient over-voltages produced by external voltage surges from the utility grid or the residual energy stored in the coupled inductor L1 when both Q1 and Q2 are turned off to occasionally stop supplying the converter currents to the utility grid.

Figure 28:
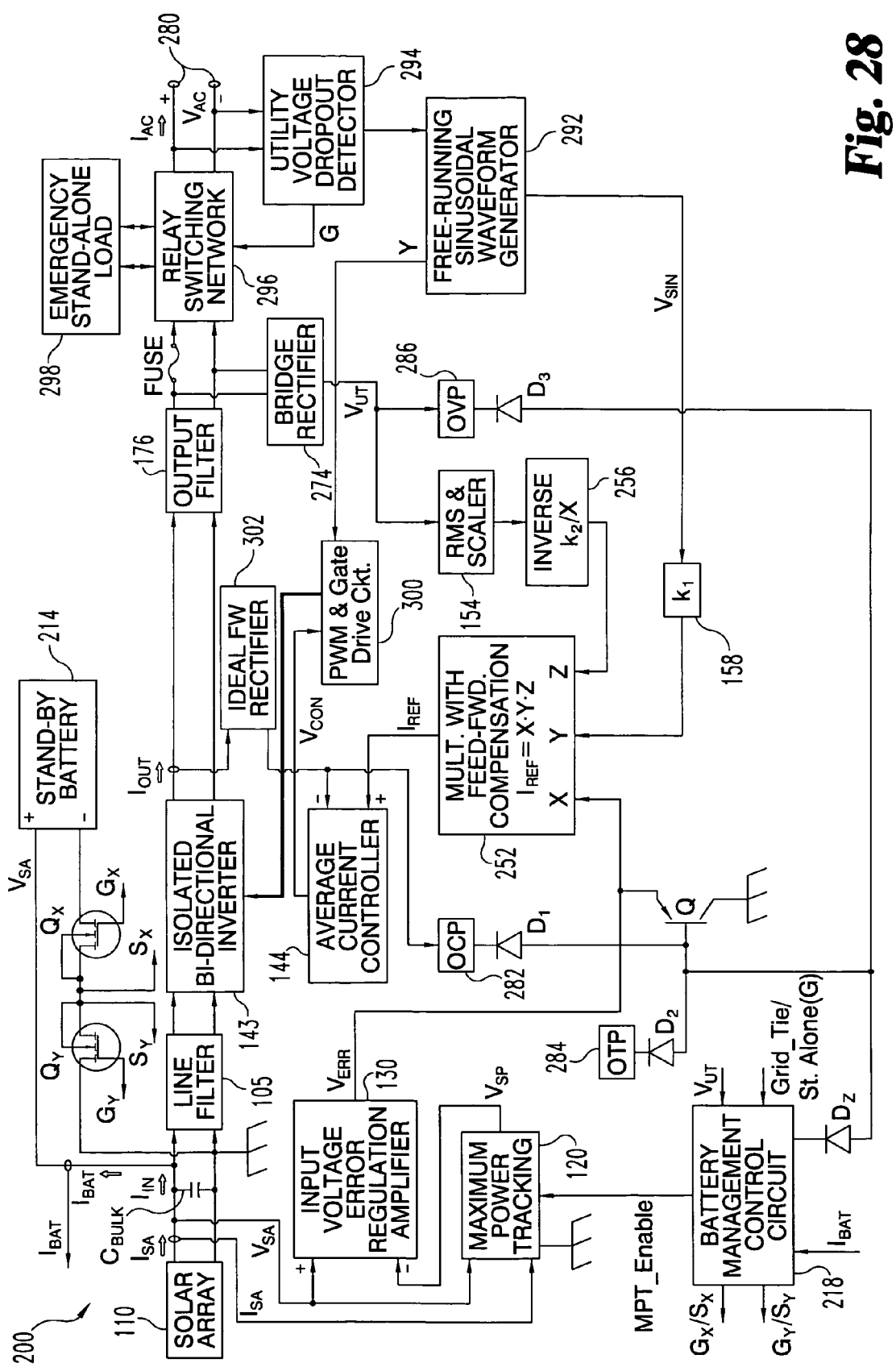
FIG. 28 is a block/schematic diagram of a maximum power tracking solar inverter with a stand-by battery and emergency stand-alone load according to a third embodiment of the present invention.
Figure 31:
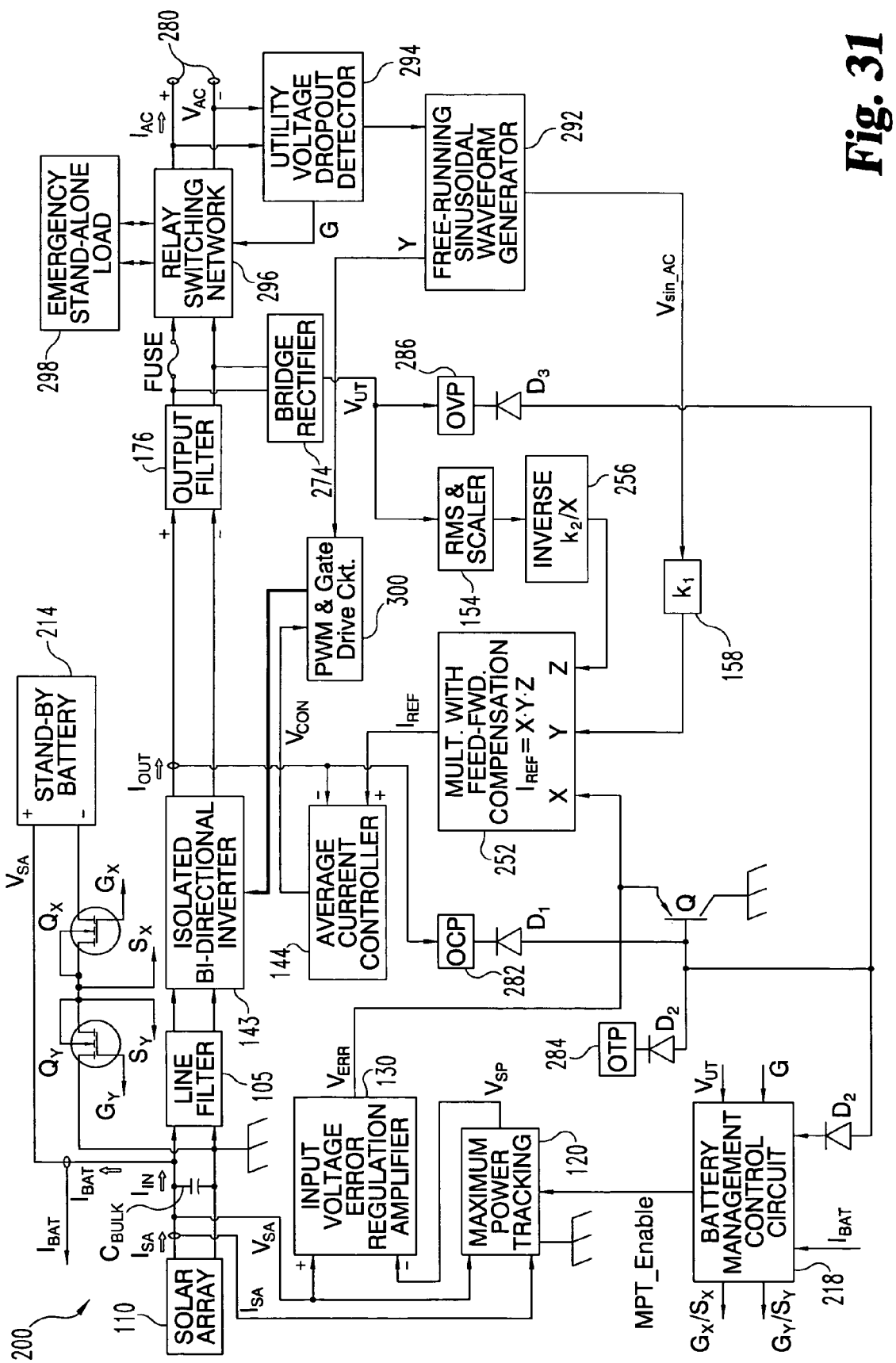
FIG. 31 is a block/schematic diagram of a maximum power tracking solar inverter using an isolated bi-directional inverter according to a fourth embodiment of the present invention.

Electrical isolation between the inverter output and the remaining control circuits, including the solar array, the line-filter, the stand-by battery, and the converter input, is achievable through isolation schemes within the following subsystems shown in FIGS. 28 and 31: (1) isolated bi-directional inverter 143 through its internal isolation transformer, (2) PWM and gate drive circuit 300 through its isolated driving transformer or opto-isolated driving circuit that provides isolated driving signals to several semiconductor switches within the inverter 143, (3) utility voltage dropout detector 294 through its voltage-sense transformer for sensing the utility AC voltage $V_{AC}$, (4) the sensed converter output current $I_{OUT}$ through an isolated current sense scheme such as a current-sense transformer (FIG. 31), (5) ideal full-wave rectifier 302 (FIG. 28) for obtaining the rectified inverter output current signal through a current-sense transformer with an ideal full-wave rectification circuit, and (6) bridge rectifier 274 for providing the sensed inverter output voltage with full-wave rectification, $V_{UT}$, through an isolated voltage sensing scheme such as a voltage-sense transformer and a bridge rectifier.

The system controller reference ground node or chassis ground as shown in FIGS. 2, 3, 25, 28, and 31 can be the power return terminal of the solar array to which all the sensed and isolated feedback and control signals are referenced. While the solar array and the line-filter may have dedicated transient energy absorption networks installed for differential-mode voltage transient absorption, the chassis ground being located at the solar array power return terminal provides the most effective path for absorption of the transient current induced by lightning at the inverter system input. Furthermore, the inverter output, the output filter 176, and the relay switching network 296 may be protected from harmful common-mode voltage transients induced by lightning coupled into the utility grid by having another transient energy absorption network installed at the utility grid output 280 with respect to the safety ground return terminal of the utility grid.

Figure 26:
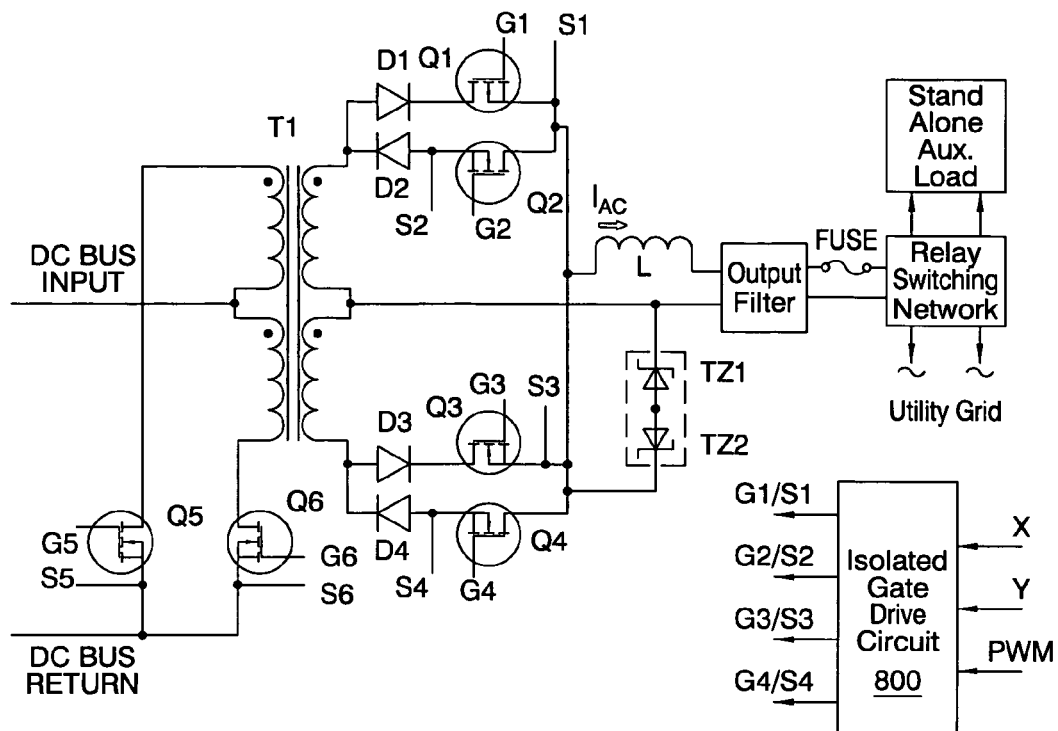
FIG. 26 is a schematic diagram of an inverter that allows bi-directional flow while driving inductive loads, for use with some embodiments of the present invention.

Several embodiments shown above possess unidirectional power flow capability that functions well with stand-alone resistive loads having insignificant inductive components, or with the near-ideal voltage sink offered by the utility grid. For highly inductive loads, the unidirectional converter topologies are less able to control their output current to track the sinusoidal waveform since their power stages cannot absorb the reactive energy that the inductive load produces twice in every utility period. For high-performance solar inverter systems that allow bi-directional flow and are capable of maintaining sinusoidal current waveforms while driving inductive loads, the inverter topology shown in FIG. 26 is preferred. That topology preserves input/output isolation and high switching frequency. With reference to FIG. 26, transistors Q5 and Q6 are always switched in a substantially perfect complimentary fashion with a 50% duty ratio. Transistors Q1 and Q3 are pulse-width modulated to control the inverter positive output current ($I_{AC}>0$) while transistors Q2 and Q4 are turned off. When the inverter output is controlled to be negative ($I_{AC}<0$), Q2 and Q4 are instead pulse-width modulated while Q1 and Q3 are turned off. Transient protection diodes TZ1 and TZ2 provide bi-directional transient energy absorption due to voltage surges and spikes from both the utility grid and excess energy stored in inductor L, regardless of the inverter mode of operation.

Figure 27:
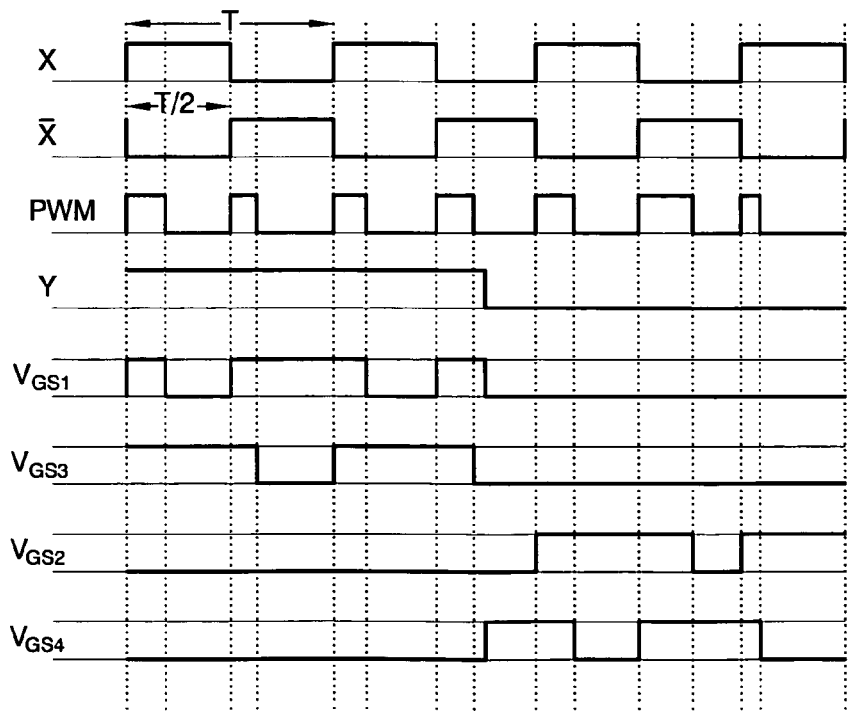
FIG. 27 is a waveform diagram of MOSFET gate-to-source driving signals for use in conjunction with the control architecture shown in FIG. 28.

FIG. 27 provides typical waveforms of the gate-to-source driving signals for MOSFETs Q1 to Q6 for use in conjunction with the unidirectional control architecture shown in FIG. 28. In FIG. 27, X represents a square-wave signal of the inverter switching frequency (e.g., 100 KHz), and Y represents the controlling signal that commands the inverter power stage to drive either positive (Y=1) or negative (Y=0) sinusoid current $I_{AC}$ into the utility grid or stand-alone load. Signal PWM represents a pulse-width modulated signal that is generated by the innermost current mode control loop that regulates $I_{AC}$ to be sinusoidal.

Output signals $V_{GSi}$ are functions of logical input signals X, Y, and PWM. In these embodiments, $$V_{GS1} = (\overline{X} + X \cdot PWM) \cdot Y$$
$$V_{GS2} = (X + \overline{X} \cdot PWM) \cdot \overline{Y}$$
$$V_{GS3} = (X + \overline{X} \cdot PWM) \cdot Y$$
$$V_{GS4} = (\overline{X} + X \cdot PWM) \cdot \overline{Y}$$
$$V_{GS5} = \overline{X}$$
$$V_{GS6} = X$$

In other embodiments, various logical combinations may be used to control the inverter and power components according to the present invention as would occur to one of ordinary skill in the art.

Figure 29:
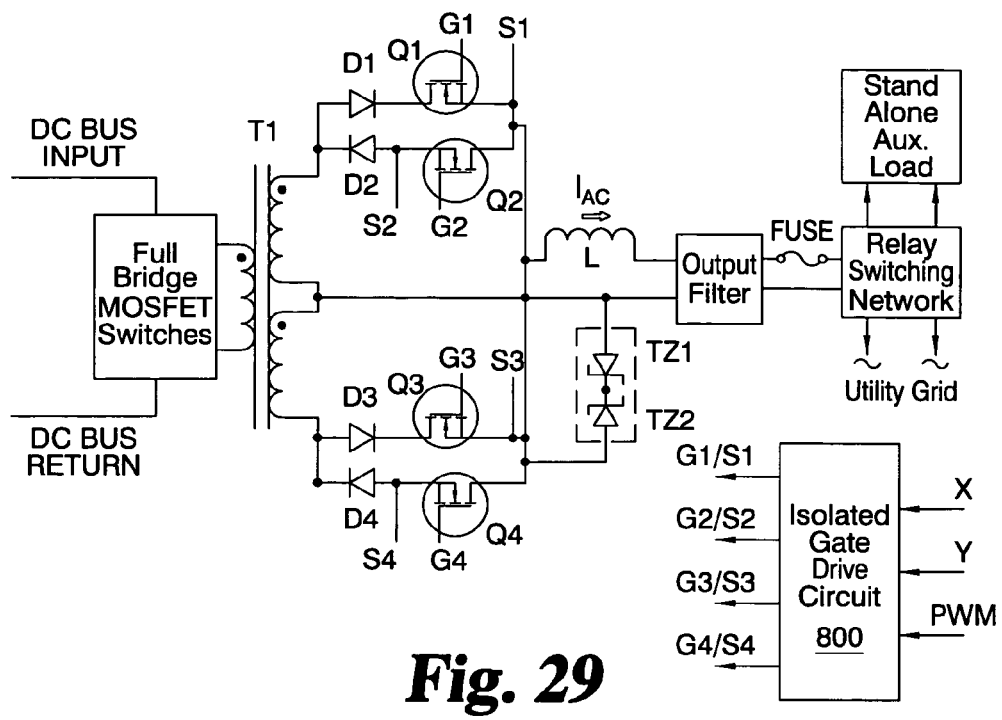
FIG. 29 schematic diagram of an alternative inverter design for use with some embodiments of the present invention.

FIG. 28 depicts an inverter control and power architecture that is applicable to inverter topologies as shown in FIGS. 26 and 29, for example, to achieve unidirectional power flow for which the gate-drive signals shown in FIG. 27 may be used. Note that the architecture of FIG. 28 actually provides bi-directional power flow capability, but the control is based on unidirectional feedback. Feedback of this nature makes it difficult to design a system capable of handling highly inductive utility grid or inductive stand-alone loads. $V_{SIN}$ is the reference rectified sinusoidal waveform that is produced by the free-running waveform generator 292. Because of the unidirectional characteristics of the $V_{SIN}$ signal, $I_{REF}$ or the current reference commanding signal is unidirectional, and consequently the gate-drive signals shown in FIG. 27 are preferably applied to the MOSFET switches shown in FIGS. 26 and 29.

FIG. 29 is another variation of the inverter system shown in FIG. 26. The full-bridge MOSFET switch topology offers simpler construction of isolation transformer T1.

Figure 30:
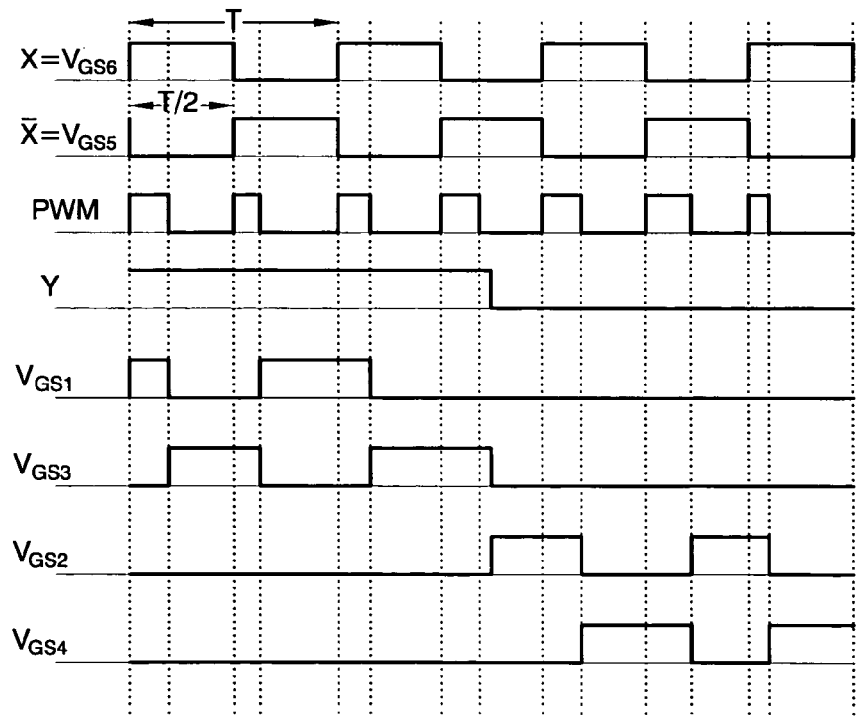
FIG. 30 is a waveform diagram of MOSFET gate-to-source driving signals for use in conjunction with the control architecture shown in FIG. 28 and the inverter shown in FIG. 29.

FIG. 30 provides typical waveforms of the gate-to-source driving signals for MOSFETs Q1 to Q6 for bi-directional power flow operation that allows the reactive energy component to flush back into the inverter. For controlling $I_{AC}>0$ (Y=1), gate-drive signals for Q1 and Q3 are always complimentary to each other based on an exclusive-OR logic for the PWM and X signals, while Q2 and Q4 are turned off. While controlling $I_{AC}<0$ (Y=0), gate-drive signals for Q2 and Q4 are always complimentary to each other based on an exclusive-OR logic for the PWM and X signals, while Q1 and Q3 are turned off. The equations governing the outputs in this embodiment are:

$$V_{GS1} = \overline{(X \oplus \overline{PWM})} \cdot Y$$
$$V_{GS2} = \overline{(X \oplus \overline{PWM})} \cdot \overline{Y}$$
$$V_{GS3} = (X \oplus PWM) \cdot Y$$
$$V_{GS4} = (X \oplus PWM) \cdot \overline{Y}$$
$$V_{GS5} = \overline{X}$$
$$V_{GS6} = X$$

Other signaling patterns may be used in alternative embodiments, as would occur to those of ordinary skill in the art.

FIG. 31 shows an inverter control and power architecture that is applicable to inverter topologies shown in FIGS. 26 and 29 to achieve bi-directional power flow using the gate-drive signals shown in FIG. 30. The stand-by battery 214 and battery management control circuit 218 in FIG. 31 have the same function as described above in relation to FIG. 25, and the same modes of operation as shown in Table 1. In this bi-directional power flow inverter system, the AC inverter output current, $I_{OUT}$, is fed back in a bipolar fashion without going through a full-wave rectification to maintain its sinusoidal continuity in both its instantaneous value and its time derivative. The bi-directional waveform of the commanding reference current, $I_{REF}$, is derived from the $V_{SIN\_AC}$ waveform being produced by a high-fidelity sinusoidal waveform generator that is either synchronized with the utility grid voltage (during the grid-tie operation) or free-running (during the stand-alone mode of operation).

The system control functions are very similar to those that exist in the unidirectional control and power architecture shown in FIG. 25. The bi-directional inverter control and power architecture provides significant improvement in the smooth regulation of the AC inverter output current despite the highly inductive impedance that sometimes exists in the long transmission line of the utility grid or a highly inductive stand-alone load. The "isolated bi-directional inverter" block shown in FIGS. 28 and 31 may have the same topology as shown in FIGS. 26 or 29, where the transient protection diodes TZ1 and TZ2 are included for clamping both internal and external voltage transients to a safe level. MOSFET gate drive switching signals as shown in FIG. 30 are derived from two controlling signals: $V_{CON}$, which is the signal output of the average current controller 144, and signal Y, which is the 50/60 Hz square-wave signal produced by the free-running generator 292. X is the high-switching-frequency square-wave signal that is internally generated within the PWM & Gate Drive circuit block. Similarly, signal PWM is internally generated with the PWM & Gate Drive circuit block, and is derived from the $V_{CON}$ signal.

Figure 32:
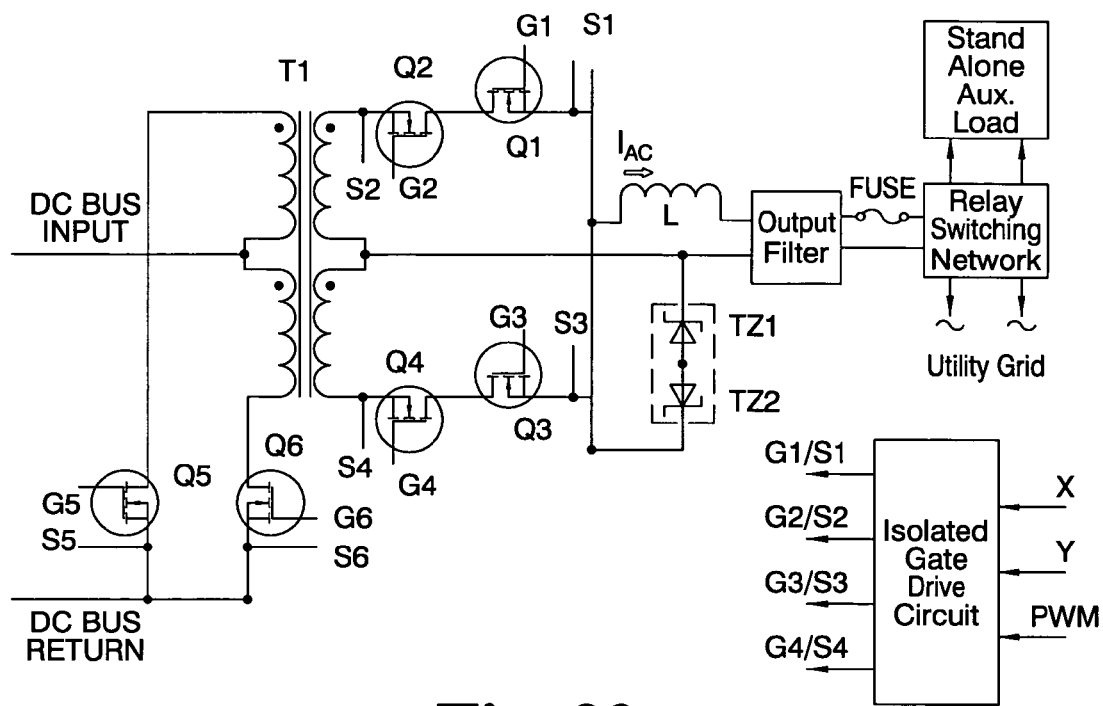
FIG. 32 is a schematic diagram of another alternative inverter design that provides for bi-directional power flow in some embodiments of the present invention.
Figure 33:
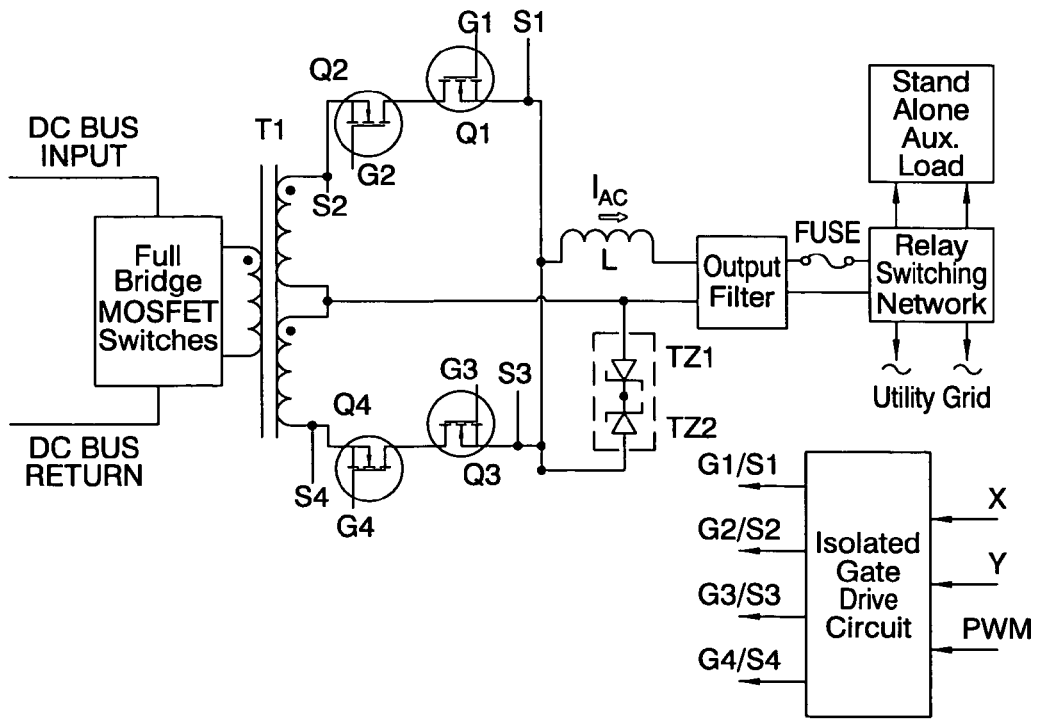
FIG. 33 is a schematic diagram of yet another alternative inverter design that provides for bi-directional power flow in some embodiments of the present invention.

Furthermore, FIGS. 32 and 33 provide alternative replacements for the bi-directional power-flow inverter topologies of push-pull and full-bridge configurations as shown in FIGS. 26 and 29, respectively. Gate drive waveforms shown in FIG. 30 and the system control architecture shown in FIG. 31 are also applicable to these alternative inverter topologies. Since the body diodes within MOSFETs Q1 to Q4 have slow reverse recovery performance, the two alternative inverter topologies are less suitable for use in the unidirectional power flow control configuration. Therefore, the inverter architecture shown in FIG. 28 and gate drive waveforms shown in FIG. 27 are preferably not applied to the topologies shown in FIGS. 32 and 33.

Figure 34:
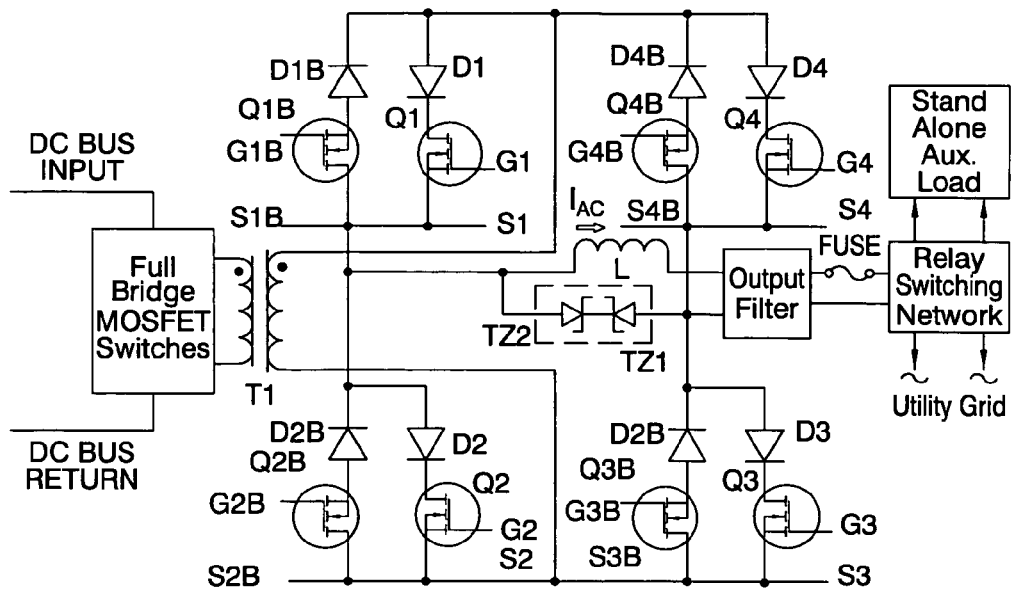
FIG. 34 is a schematic diagram of still another alternative inverter design that provides for bi-directional power flow in some embodiments of the present invention.
Figure 35:
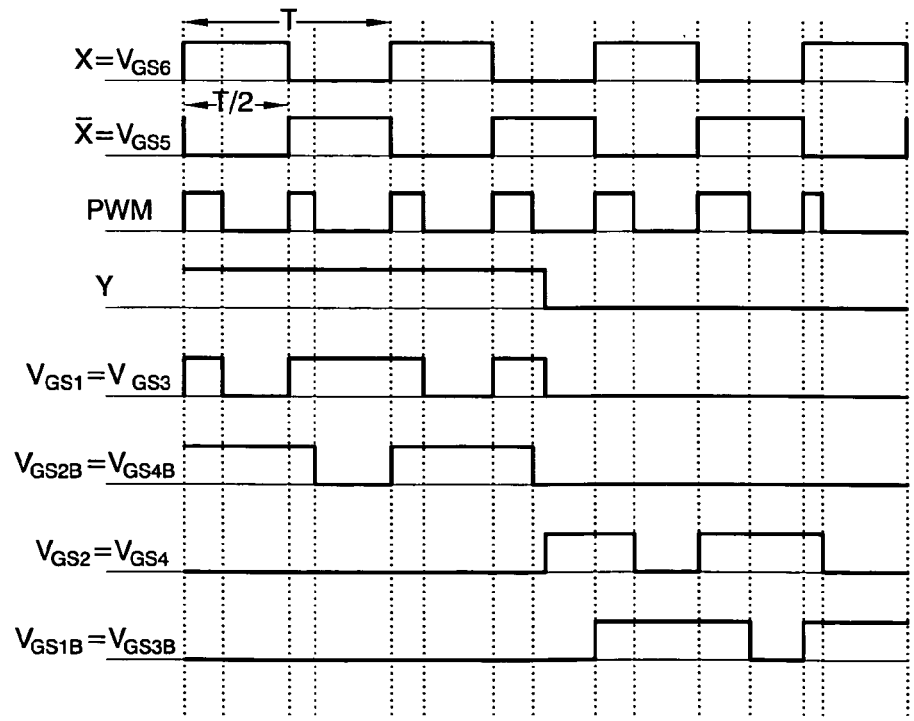
FIG. 35 is a waveform diagram of MOSFET gate-to-source driving signals for use in conjunction with the control architecture shown in FIG. 28 and the inverter shown in FIG. 34.

For further improved efficiency in performance of the isolation transformer, its construction should to be as simple as possible. The inverter topology shown in FIG. 34 employs a simple transformer configuration while preserving input/output isolation and high switching frequency of operation. Two diagonal pairs of MOSFETs in the front-end switching bridge are switched in a complementary fashion with 50% duty ratio. Eight MOSFETs in the back-end switching bridge are pulse-width modulated. MOSFETs Q1, Q3, Q2B, and Q4B are pulse-width modulated to control the inverter positive output current ($I_{AC}$>0) while MOSFETs Q1B, Q3B, Q2, and Q4 are turned off. When the inverter output current is controlled to be negative ($I_{AC}$<0), MOSFETs Q1B, Q3B, Q2, and Q4 are instead pulse-width modulated, and MOSFETs Q1, Q3, Q2B, and Q4B are turned off. Transient protection diodes TZ1 and TZ2 provide bi-directional transient energy absorption due to voltage surges and spikes from both the utility grid and excess energy stored in inductor L, regardless of the mode of operation of the inverter. Instead of using the front-end switching bridge configuration as shown in FIG. 34, some embodiments of transformer T1 have a center-tap configuration with a push-pull front-end configuration with MOSFETs Q5 and Q6 as shown in FIG. 26. FIG. 35 provides typical waveforms of the gate-to-source driving signals for eight MOSFETs in the back-end switching bridge shown in FIG. 34 for use in conjunction with the unidirectional control architecture shown in FIG. 28.

Figure 36:
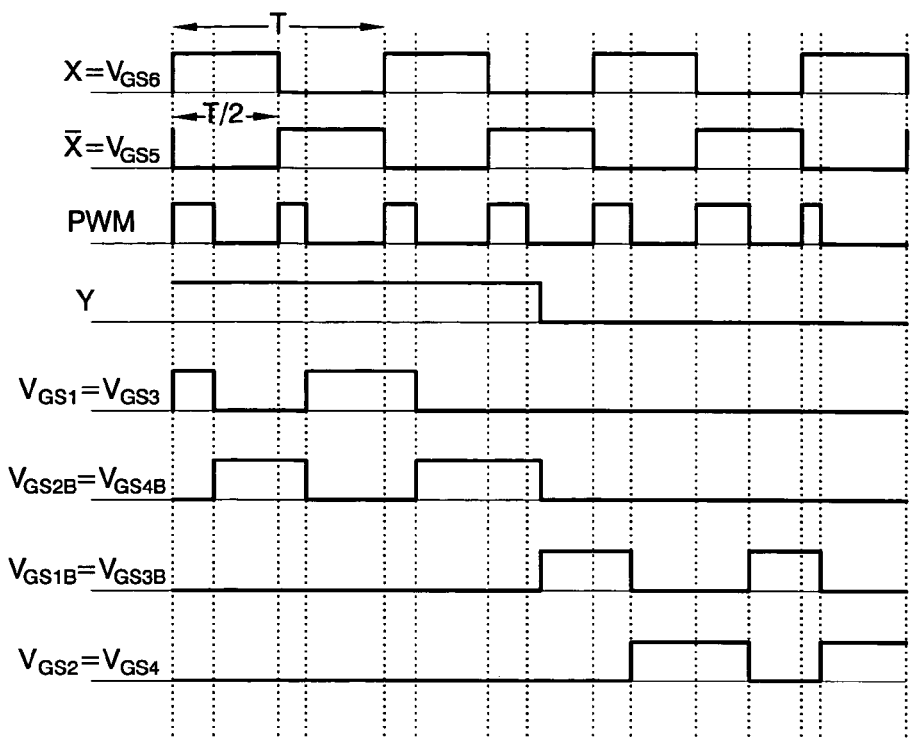
FIG. 36 is a waveform diagram of alternative MOSFET gate-to-source driving signals for use in conjunction with the control architecture shown in FIG. 31 and the inverter shown in FIG. 34.

FIG. 36 provides typical waveforms of the gate-to-source driving signals for eight MOSFETs Q1 to Q4 and Q1B to Q4B for a bi-directional power flow operation that allows the reactive energy component to smoothly flush back into the inverter. For controlling $I_{AC}$>0 (Y=1), two pairs of gate drive signals for the Q1–Q3 pair and the Q2B–Q4B pair are always complementary to each other based on an exclusive-OR logic for the PWM and X signals while Q1B, Q3B, Q2, and Q4 are turned off. For controlling $I_{AC}$<0 (Y=0), gate drive signals for the Q2–Q4 pair and the Q1B–Q3B pair are complementary to each other based on an exclusive-OR logic for the PWM and X signals, while Q1, Q3, Q2B, and Q4B are turned off.

Figure 37:
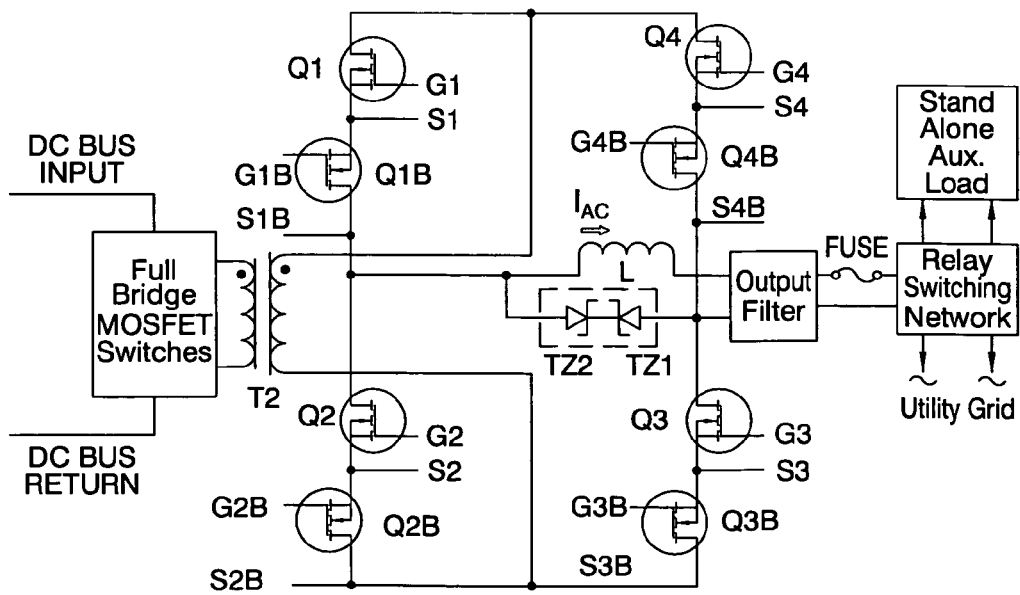
FIG. 37 is a schematic diagram of yet another alternative replacement for the bi-directional power-flow inverter topologies with front-end push-pull or front-end full-bridge configurations as shown in FIG. 34.

Furthermore, FIG. 37 provides an alternative replacement for the bi-directional power-flow inverter topologies with front-end push-pull or front-end full-bridge configurations as shown in FIG. 34. Gate drive waveforms shown in FIG. 36 and the system control architecture shown in FIG. 31 are also applicable to the alternative inverter topology. Since the body diodes within the eight MOSFETs in the back-end switching bridge have slow reverse recovery performance, the alternative inverter topology is not suitable for use in the unidirectional power flow control configuration. Therefore, the inverter architecture shown in FIG. 28 and gate drive waveforms shown in FIG. 35 are preferably not applied in the topology shown in FIG. 37.

Figure 11:
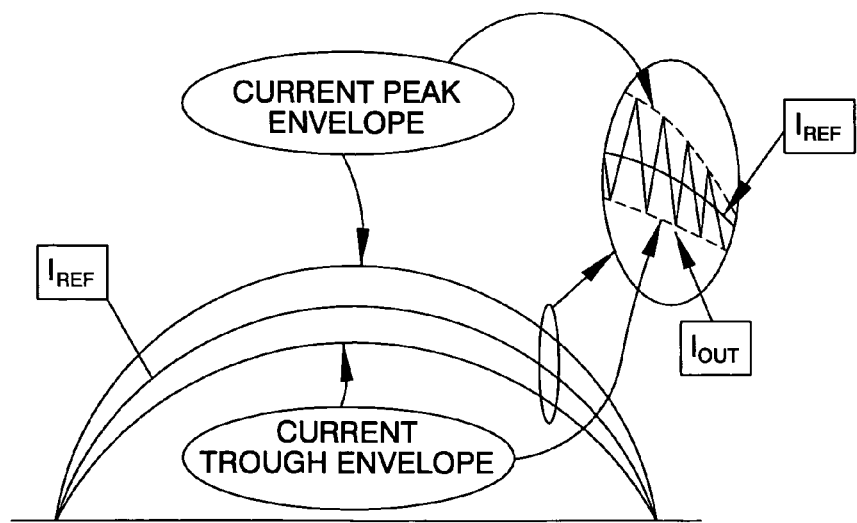
FIG. 11 is a graph illustrating reference current and output current in an average output current regulation mode of a DC-DC converter in various embodiments of the present invention.

From the overall block diagram of the overall solar inverter system as shown in FIG. 1, the DC-DC converter power stage 140 including the average current regulation controller 144 forms a "current-mode" converter that accepts $I_{REF}$ as its commanding current input and delivers the converter output current $I_{OUT}$. The moving average of $I_{OUT}$ is instantaneously regulated at $I_{REF}$ as shown conceptually in FIG. 11.

Figure 12:
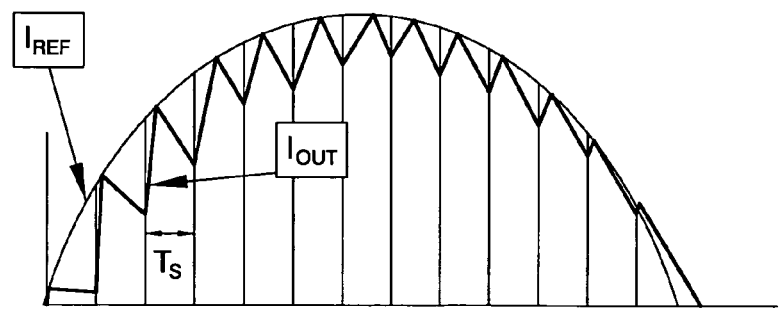
FIG. 12 is a graph illustrating reference current and output current in a peak-current programmed control mode of a DC-DC converter in various embodiments of the present invention.
Figure 13:
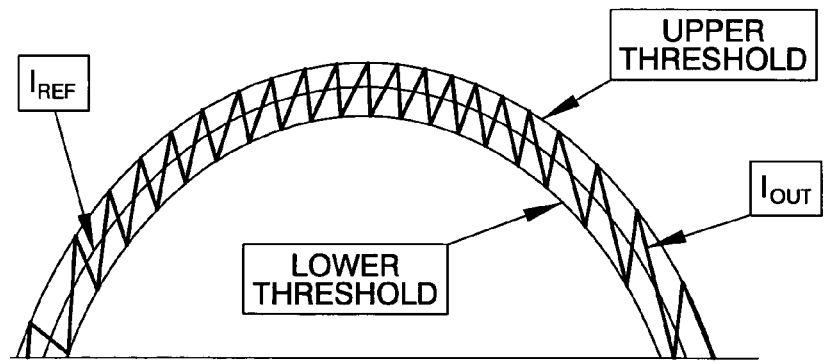
FIG. 13 is a graph illustrating reference current, upper threshold, lower threshold, and output current in a hysteretic current regulation mode of a DC-DC converter in various embodiments of the present invention.
Figure 14:
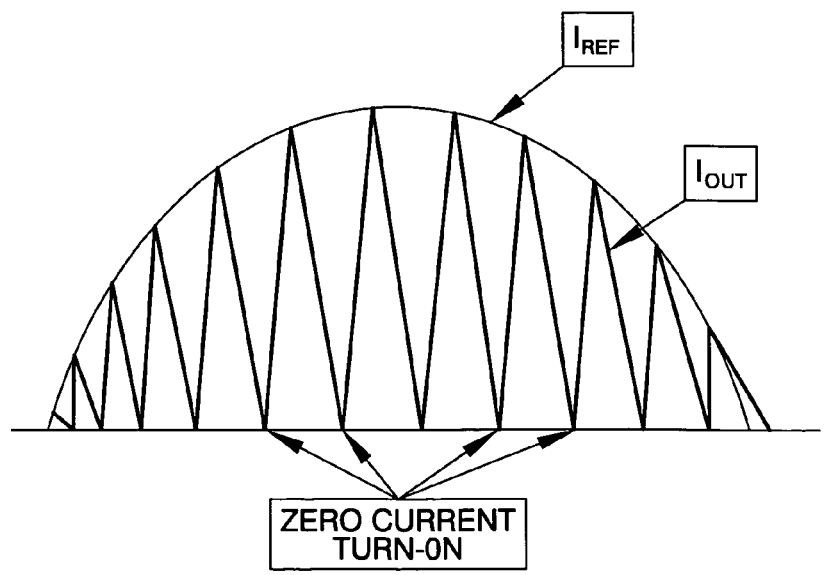
FIG. 14 is a graph illustrating reference input current and output current in a continuous conduction mode (with zero-current turn-on) of a DC-DC converter in various embodiments of the present invention.

In general, a different "current-mode" control approach can be employed instead of average current regulation control 144. At least three alternative "current-mode" control approaches are taken in various embodiments for tracking the sinusoidal commanding waveform $I_{REF}$, including (1) peak-current programmed control, (2) hysteretic control, and (3) peak-current turn-off and zero-current-turn-on control. FIG. 12 illustrates peak-current programmed control, wherein instantaneous peaks of the converter output current are controlled to track $I_{REF}$. FIG. 13 illustrates hysteretic current regulation control, in that both instantaneous peaks and troughs of the converter output current are respectively controlled to track the upper and lower commanding thresholds being generated from $I_{REF}$ signal. For example, the upper and lower commanding threshold signals are respectively the peak and trough envelopes between which $I_{REF}$ commanding signal always resides. FIG. 14 illustrates peak-current turn-off and zero-current turn-on control, wherein instantaneous peaks of the converter output current are controlled to track $I_{REF}$ and troughs of the output current are controlled to reach zero current without zero-current dead time. As a consequence, the controller produces very high output current ripples having moving-average values that constitute a sinusoidal wave shape by proper output filtering.

Figure 38:
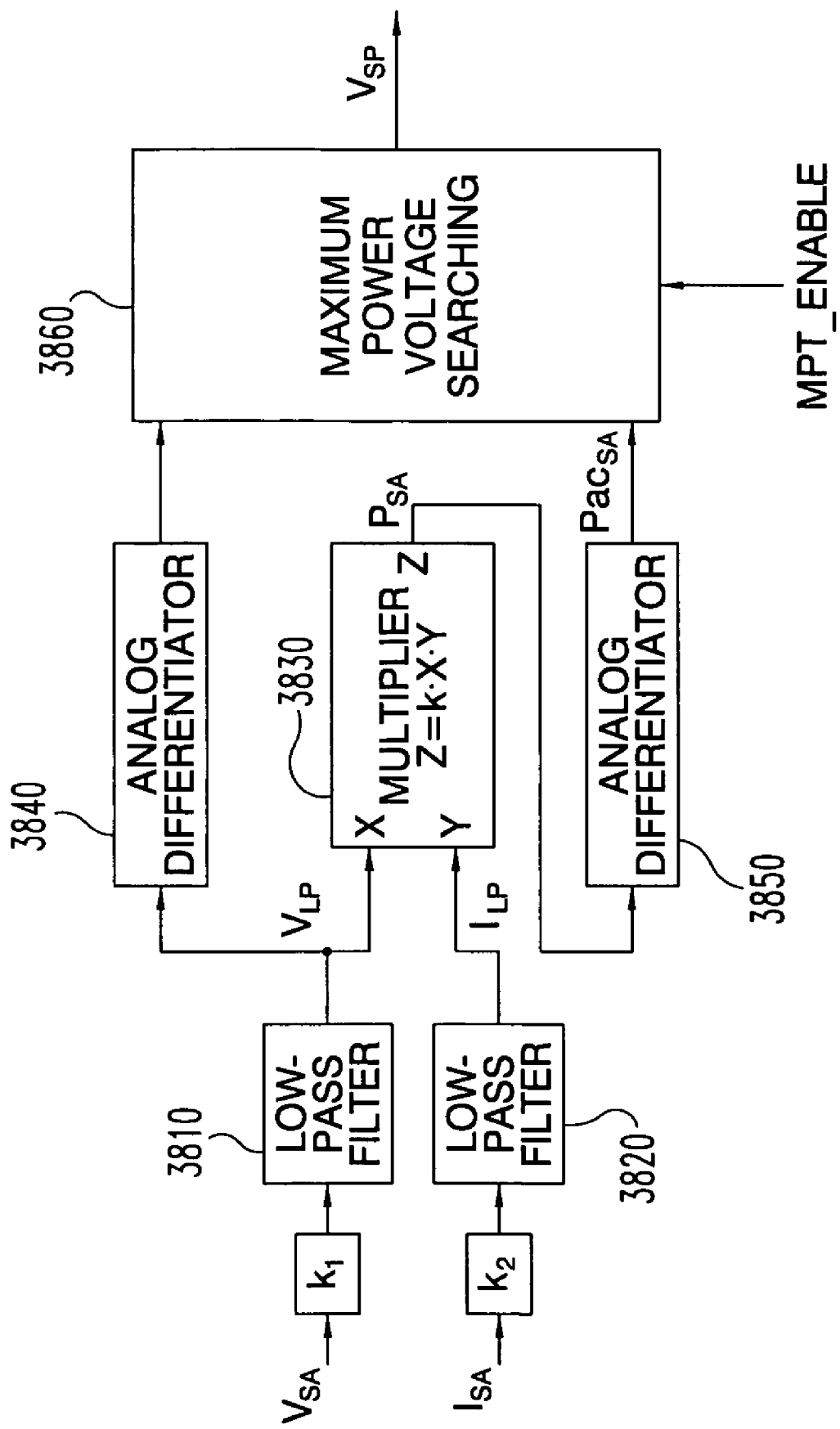
FIG. 38 is a block diagram of a maximum power tracking control circuit used with various embodiments of the present invention.
Figure 39:
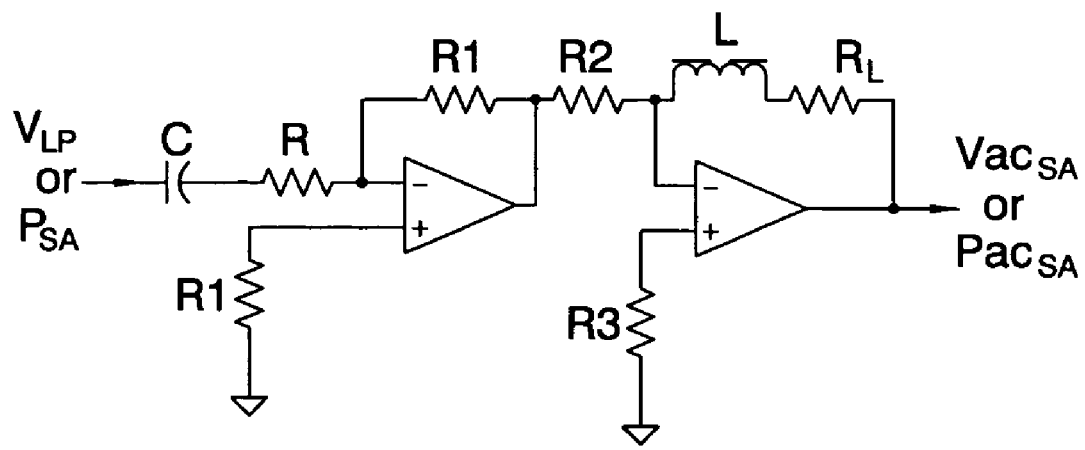
FIGS. 39 and 40 are alternative analog differentiator circuits for use with the MPT control circuit of FIG. 38.
Figure 40:
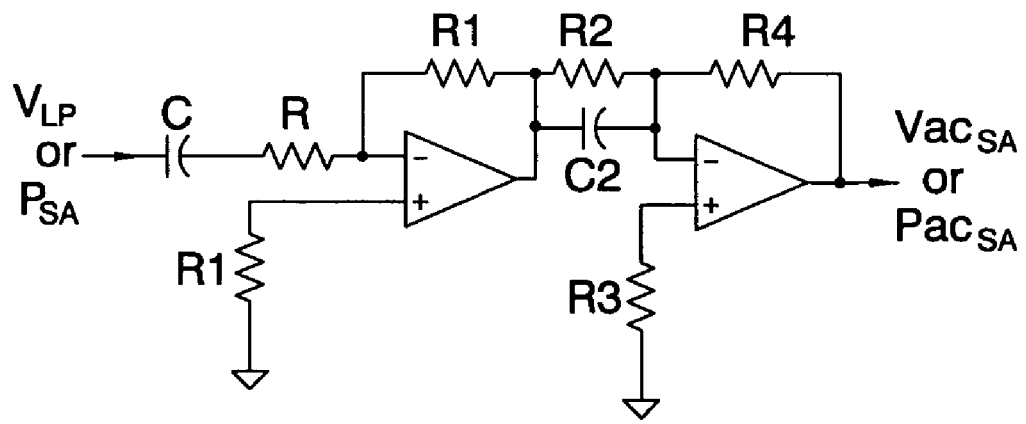
Figure 41:
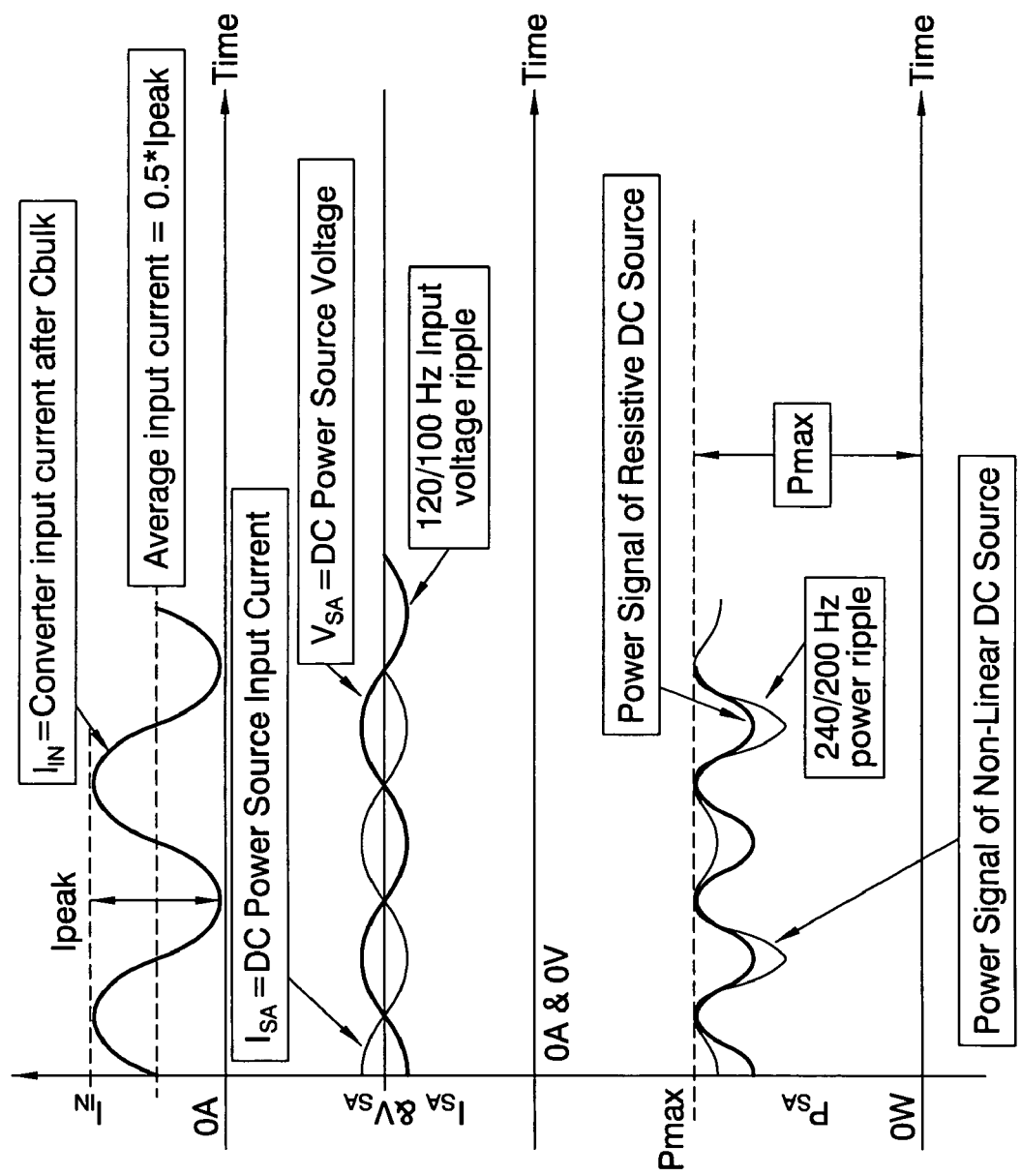
FIG. 41 is a graph of converter input current $I_{IN}$, DC power source current and voltage $I_{SA}$ and $V_{SA}$, and power signal of a non-linear DC source $P_{SA}$ that are used in some embodiments of the present invention.
Figure 42:
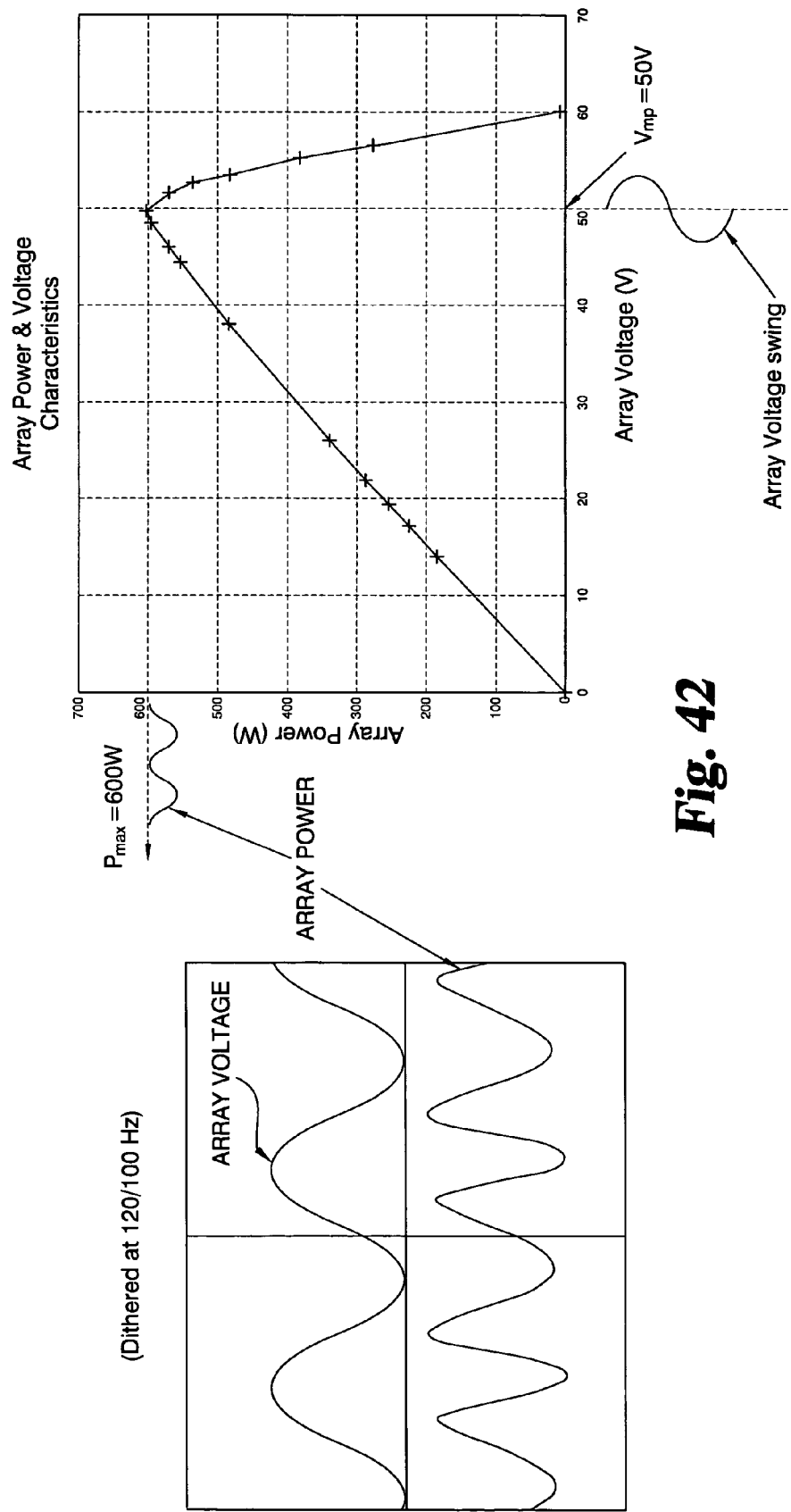
FIG. 42 is a graph over time of array output voltage and power signals, and the associated array power/voltage characteristic curve, when some embodiments of the present invention operate at the peak power point of the array.
Figure 43:
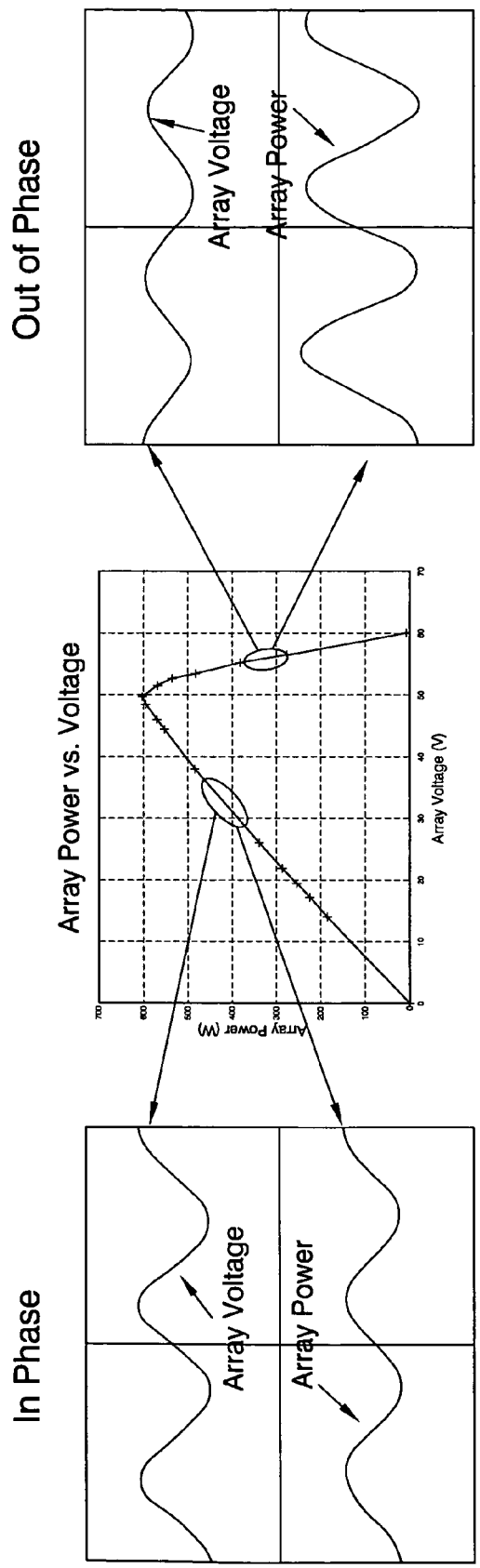
FIG. 43 is a graph over time of array output voltage and power signals, and the associated array power/voltage characteristic curve, when some embodiments of the present invention operate away from the peak power point of the array.
Figure 44:
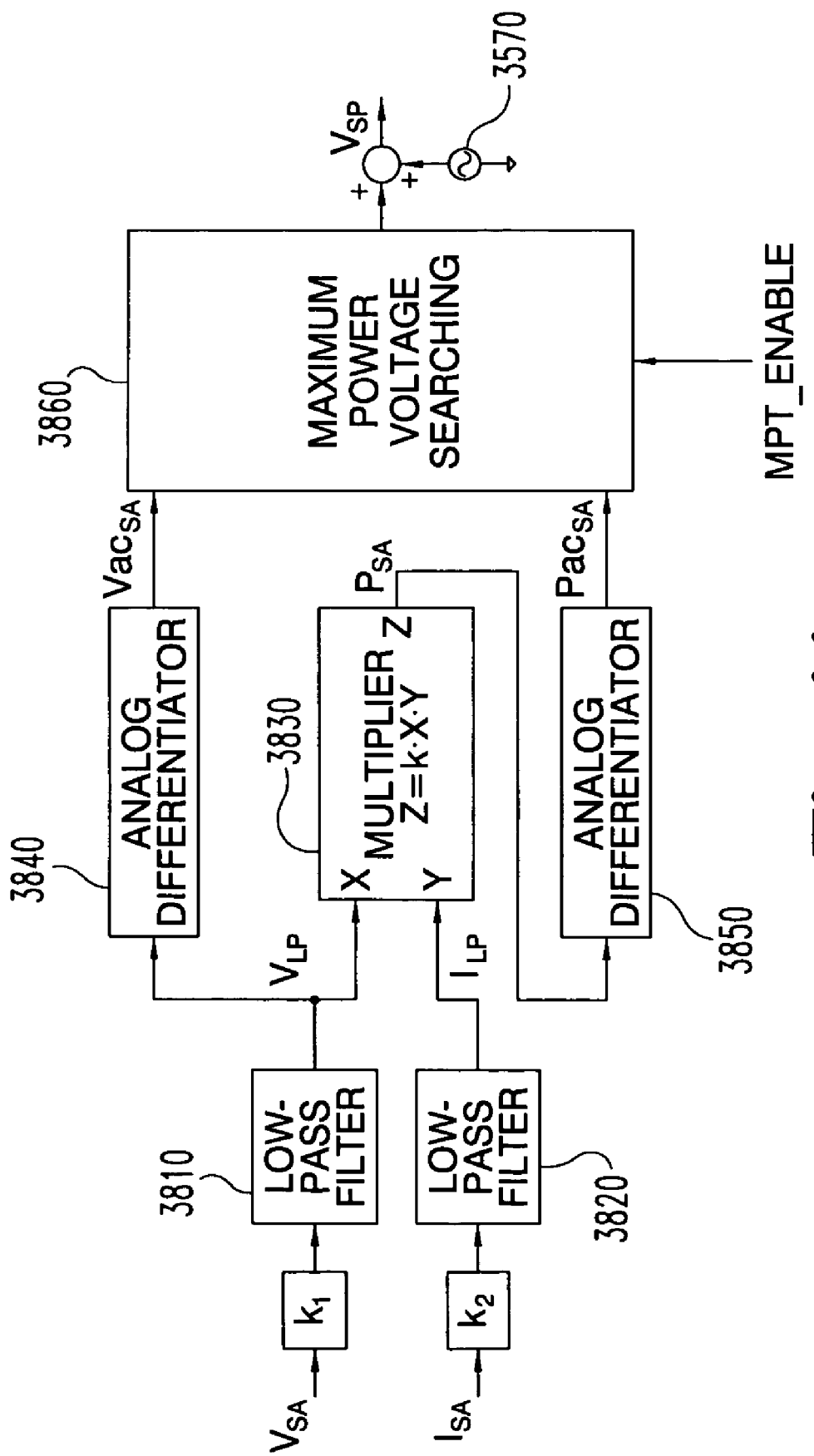
FIG. 44 is a block diagram of a maximum power tracking control circuit with additional dither signal injection.

One maximum power tracking (MPT) control circuit that is used with various embodiments of the present invention (for example, as MPT control in FIG. 1) is shown in FIG. 38, with partial schematics shown in FIGS. 39 and 40 and certain steady-state waveforms in FIGS. 41–43. The output voltage $V_{SA}$ and current $I_{SA}$ of solar array 110 are sensed with scaling factors $k_1$ and $k_2$, respectively, and are low-pass filtered by filters 3810 and 3820 to obtain signals $V_{LP}$ and $I_{LP}$ by removing switching noise. These two low-pass filters 3810 and 3820 may have the same or different corner frequencies, but preferably have corner frequencies of at least ten times their ripple frequency to preserve the phase of the sensed and filtered voltage and current signals $V_{LP}$ and $I_{LP}$. Through an analog multiplier 3830, power signal $P_{SA}$ is then derived from the product of $V_{LP}$ and $I_{LP}$. Both $V_{LP}$ and $P_{SA}$ signals are fed into their respective analog differentiators 3840 and 3850, which detect the time derivatives for both the voltage and power signals. The time derivative outputs $Vac_{SA}$ and $Pac_{SA}$ are preferably processed in block 3860 according to the maximum power tracking scheme described in U.S. Pat. Nos. 6,281,485 and 6,369,462. Therefore, it is both feasible and effective to implement MPT control circuit 120 (see FIG. 1) with simple analog and digital discrete parts without complex microprocessor-based circuitry. Application-specific integrated circuits (ASICs) will be developed in some embodiments using similar analog and discreet configurations as discussed herein and in the two patents just cited. Furthermore, when the solar array characteristics are weak due to long-term degradation and/or low solar flux, the inherent dither signals extracted from the solar array voltage and power signals could be too small to accurately determine a proper control direction toward the maximum power point. Under these circumstances, an additional dither signal may be injected and superimposed on the commanding set-point voltage $V_{SP}$ to allow the extracted dither signals to achieve a better signal-to-noise ratio for better tracking efficiency as shown by an AC source 3570 in FIG. 44. The extra dither signal of a lower frequency with respect to the frequency of the inherent dither signal (100/120 Hz) is preferred, such as at 10 to 15 Hz, since the input voltage regulation control loop has the comparable unity-gain crossover frequency, thereby allowing the solar array voltage and current to produce sufficient AC amplitude of the extracted dither signals used for maximum power tracking.

As shown in FIGS. 39 and 40, two analog differentiator circuits are more simple to design and more economical to build than the double-stage sample-and-hold circuits with 2-phase clocks that are employed in the '485 and '462 patents cited in the paragraph immediately above. Waveforms of the 120/100 Hz input voltage and current ripples of the DC power sources are shown in the traces in the center strip of FIG. 41. These 120/100 Hz ripples inherently exist as a result of the rectified sinusoid current regulation that causes the converter to absorb the input current (see the top trace in FIG. 41) that is drawn from both the DC source and the bulk input capacitor $C_{bulk}$. The peak current drawn by the converter is twice the average current drawn from the DC source. FIG. 41 illustrates the steady-state waveforms during the maximum power tracking mode, where the power drawn from the DC power source processes AC power ripple that has a frequency (240/200 Hz) twice the frequency of the AC voltage and current ripples superimposed on the DC source voltage and current. For a linear (resistive) DC source, the 240/200 Hz power ripple signal has a symmetric sinusoidal wave shape. For a non-linear DC source, the power ripple signal has an asymmetric sinusoidal wave shape as shown in the lower traces of FIG. 41.

FIGS. 42 and 43 show in more detail how the voltage and power ripple of a non-linear DC power source are overlaid. These figures illustrate power versus voltage characteristics of the non-linear DC power source for three operating conditions: (1) at the maximum power point (FIG. 42), (2) on the right side of the maximum power point on the characteristic curve ("out-of-phase" traces on the left side of FIG. 43), and (3) on the left side of the maximum power point along the characteristic curve ("in-phase" traces on the left side of FIG. 43).

The differentiator circuit of FIG. 39 is preferably designed to have a desired transfer function $$\frac{R_L}{R_2} S \cdot C \cdot R_1 \frac{\left(S \frac{L}{R_L} + 1\right)}{(S \cdot C \cdot R + 1)}.$$

When $L/R_L = C \cdot R$, the circuit behaves as a differentiator with gain $$S \cdot C \cdot R_1 \frac{R_L}{R_2}.$$

Similarly, the alternative differentiator circuit in FIG. 40 has a transfer function $$\frac{R_4}{R_2} S \cdot C \cdot R_1 \frac{S \cdot C_2 \cdot R_2 + 1}{S \cdot C \cdot R + 1}.$$

When $C \cdot R = C_2 \cdot R_2$, the circuit behaves as a differentiator with gain $$S \cdot C \cdot R_1 \cdot \frac{R_4}{R_2}.$$

3 Simulation of the System

A computer simulation has been executed for the embodiment shown in FIG. 1, with the following results.

3.1 MPT of Mode I and II

Figure 15:
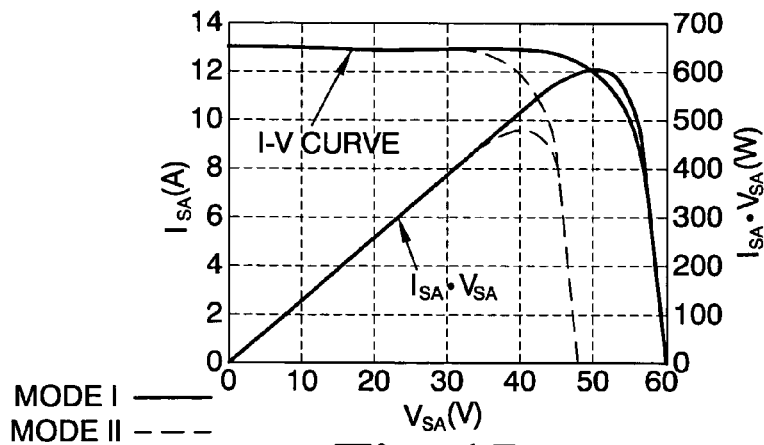
FIG. 15 is a graph of current-voltage and power-voltage characteristic curves for solar arrays in modes I and II according to certain embodiments.

Under different weather conditions and solar radiation levels, the solar array 110 has different characteristic I–V curves and different maximum power points. To demonstrate the adaptability of the inverter under the control of MPT controller, two modes of characteristic I–V curves are chosen in simulation, which are shown in FIG. 15. In this simulation, the two modes were switched linearly, and the transition time of these two modes was set to be 0.1 second. As shown in FIG. 15, the solar array jumps between these two modes as time passes. The maximum power for modes I and II are set at 600 watts and 480 watts, respectively.

Figure 16:
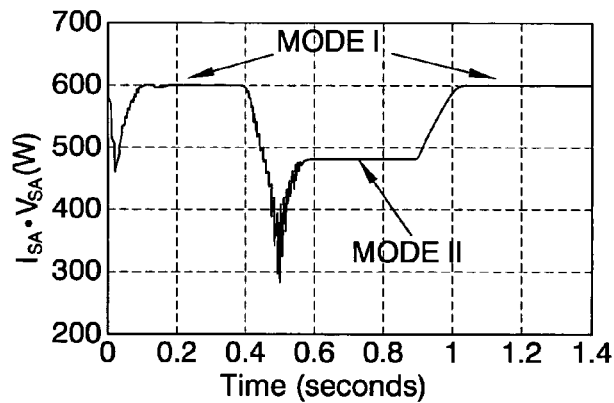
FIG. 16 is a graph of solar array output power ($I_{SA} \cdot V_{SA}$) in modes I and II according to certain simulated embodiments.

As shown in FIG. 16, the power output of the solar array switches between 600 watts and 480 watts during solar array mode switching. This requires the output power of the solar array 110 to track the maximum power under the specific mode of the solar array 110 at that time. The simulation results show the stability of the system under the step change of the solar array maximum power point and the dynamic character of the MPT controller.

3.2 Utility Grid Interface

Figure 17:
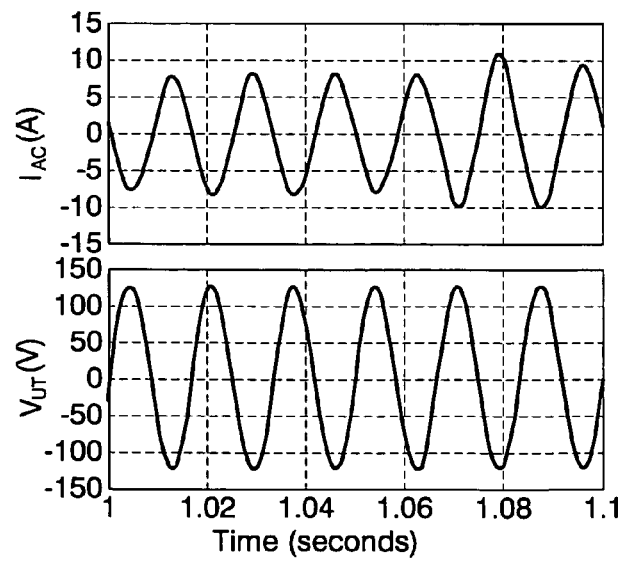
FIG. 17 is a graph of utility grid current $I_{AC}$ and voltage $V_{UT}$ over time according to one simulated embodiment of the present invention.
Figure 18:
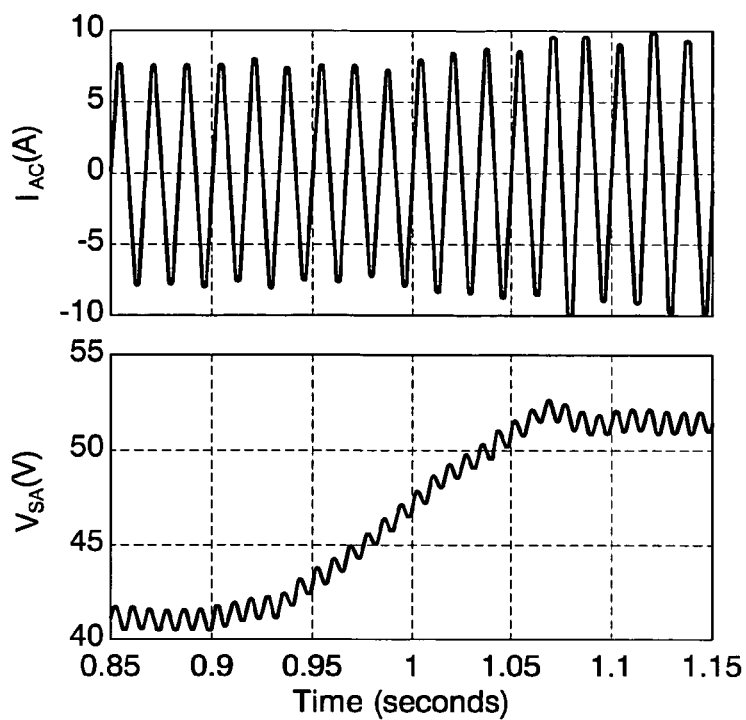
FIG. 18 is a graph of utility grid current $I_{AC}$ and solar array voltage $V_{SA}$ over time in one simulated embodiment of the present invention.

FIG. 17 shows that the voltage and current of utility grid are 180° out of phase, so the energy from the solar array 110 will be charged into the utility grid at terminals 180. Further, the current is nearly pure sinusoid with fewer harmonics, so the utility grid will not be "polluted" by the inverter. As shown in FIG. 18, the amplitude of the solar array voltage ripple is very small even when the current injected into the utility grid is low-frequency sinusoid. After the maximum power point is achieved, there is still a 120/100 Hz ripple on the solar array voltage. The frequency of the solar array voltage ripple is double that of the utility AC power frequency, and the amplitude of the ripple is controlled in various embodiments by selection of capacitor $C_{BULK}$ between the solar array and DC-DC converter. The second harmonic voltage ripple will worsen the performance of average current controller, and will increase the third harmonics on the utility grid current as discussed in L. H. Dixon, "High Power Factor Switching Preregulator Design Optimization," Unitrode Power Supply Design Seminar Manual SEM800, 1991. To further minimize the solar array voltage ripple, an input filter is designed to dampen the specific frequency of 120/100 Hz. To overcome the problem caused by local maximum power point, a dither signal of lower frequency than 120/100 Hz (see Wenkai Wu, N. Pongratananukul, Q. Weihong, K. Rustom, T. Kasparis, I. Batarseh, "DSP-Based Multiple Peak Power Tracking for Expandable Power System," Applied Power Electronics Conference and Exposition, APEC Eighteenth Annual IEEE, Feb. 9–13, 2003, Vol. 1, pages 525–530) will be applied in the MPT controller, so the solar array voltage will not be trapped at a local maximum power point that is not at the "true" peak power voltage.

3.3 DC-DC Converter

Figure 19:
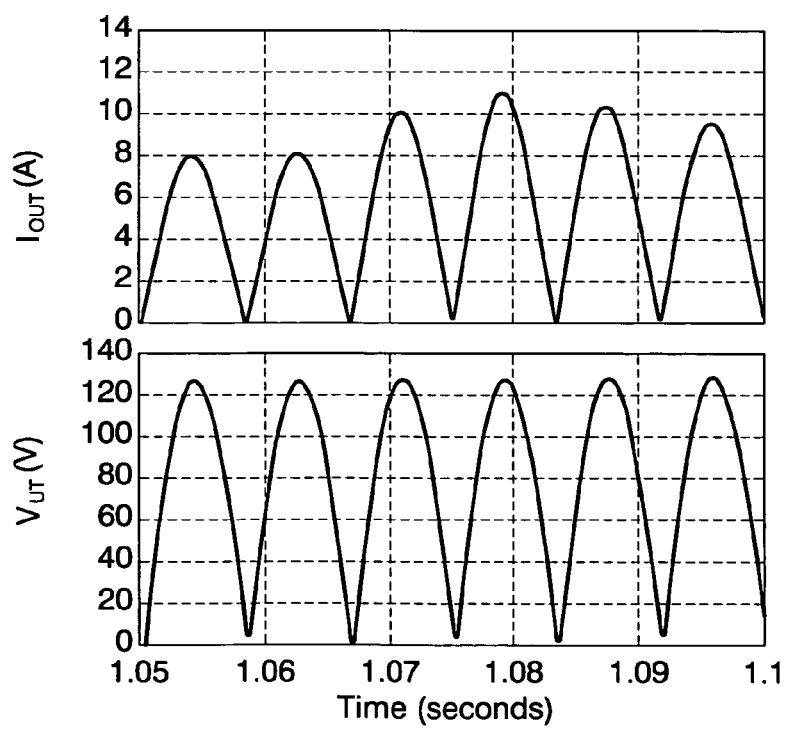
FIG. 19 is a graph of current output $I_{OUT}$ and voltage output $V_{UT}$ from the DC-DC converter over time in one simulated embodiment of the present invention.

To simplify the inverter design, the output current, $I_{OUT}$, and voltage, $V_{UT}$, of DC-DC converter 142 are preferably synchronized rectified sinusoids as shown in FIG. 19. The output voltage of the DC-DC converter is just the rectified utility grid voltage $V_{UT}$. $I_{OUT}$ will be controlled by $I_{REF}$, the reference of average current controller, to yield synchronized rectified sinusoid output current as discussed in Jaber Abu-Qahouq and Issa Batarseh, "Unified Steady-State Analysis of Soft-Switching DC-DC Converters," IEEE Transactions on Power Electronics, September 2002, Vol. 17, No. 5, pages 684–691.

3.4 Feedback Circuits

Figure 20:
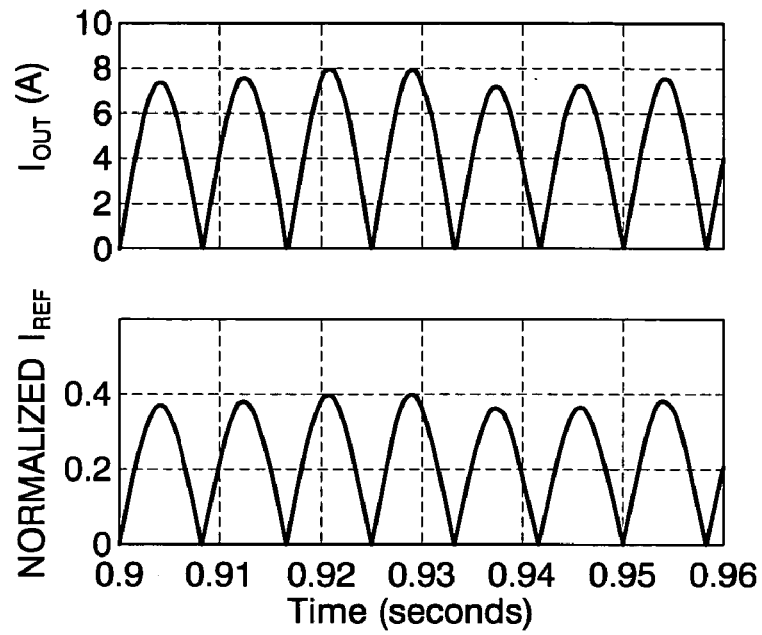
FIG. 20 is a graph of output current $I_{OUT}$ and normalized reference current $I_{REF}$ over time according to one simulated embodiment of the present invention.

The feedback portion of the proposed maximum power tracking solar inverter consists of the following blocks:

Average current controller 144 provides a band-limited control signal $V_{CON}$ to the DC-DC converter to produce rectified sinusoid output current that is synchronized to the utility voltage. A reference current signal, $I_{REF}$, generated by multiplier with feed forward compensation 152, decides the shape and amplitude of $I_{OUT}$ as shown in FIG. 20.

Multiplier with feed-forward compensation 152 will generate $I_{REF}$ from $V_{UT}$ and $V_{ERR}$. The signal $V_{UT}$ is pre-processed before being sent to the multiplier 152, as discussed above.

Upon reaching steady state, SA voltage regulation error amplifier 130 keeps the solar array voltage $V_{SA}$ regulated at the array maximum power voltage. $V_{ERR}$, the output of SA error amplifier 130, determines the amplitude of $I_{OUT}$. SA output power and voltage, with their corresponding control signals, are shown in FIGS. 21 and 22.

Figure 21:
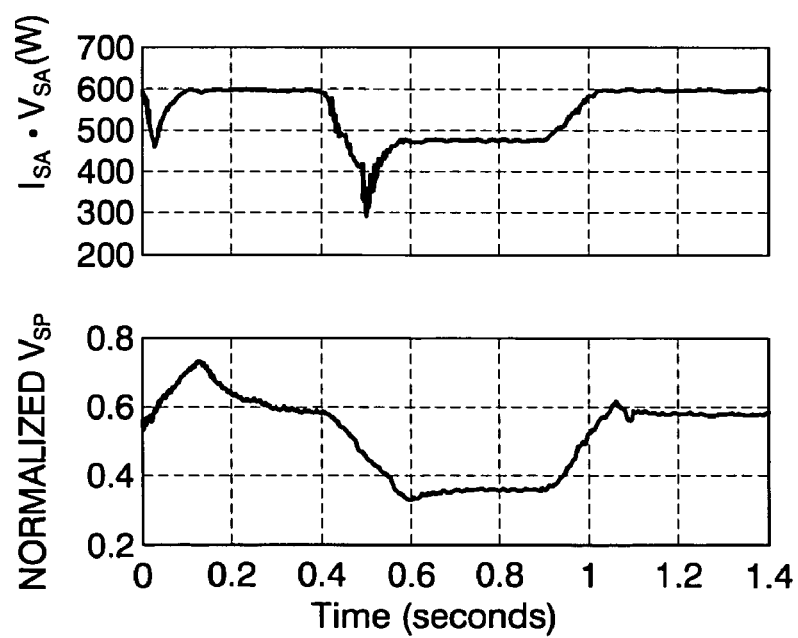
FIG. 21 is a graph of solar array output power ($I_{SA} \cdot V_{SA}$) and MPT set-point voltage $V_{SP}$ over time according to one simulated embodiment of the present invention.
Figure 22:
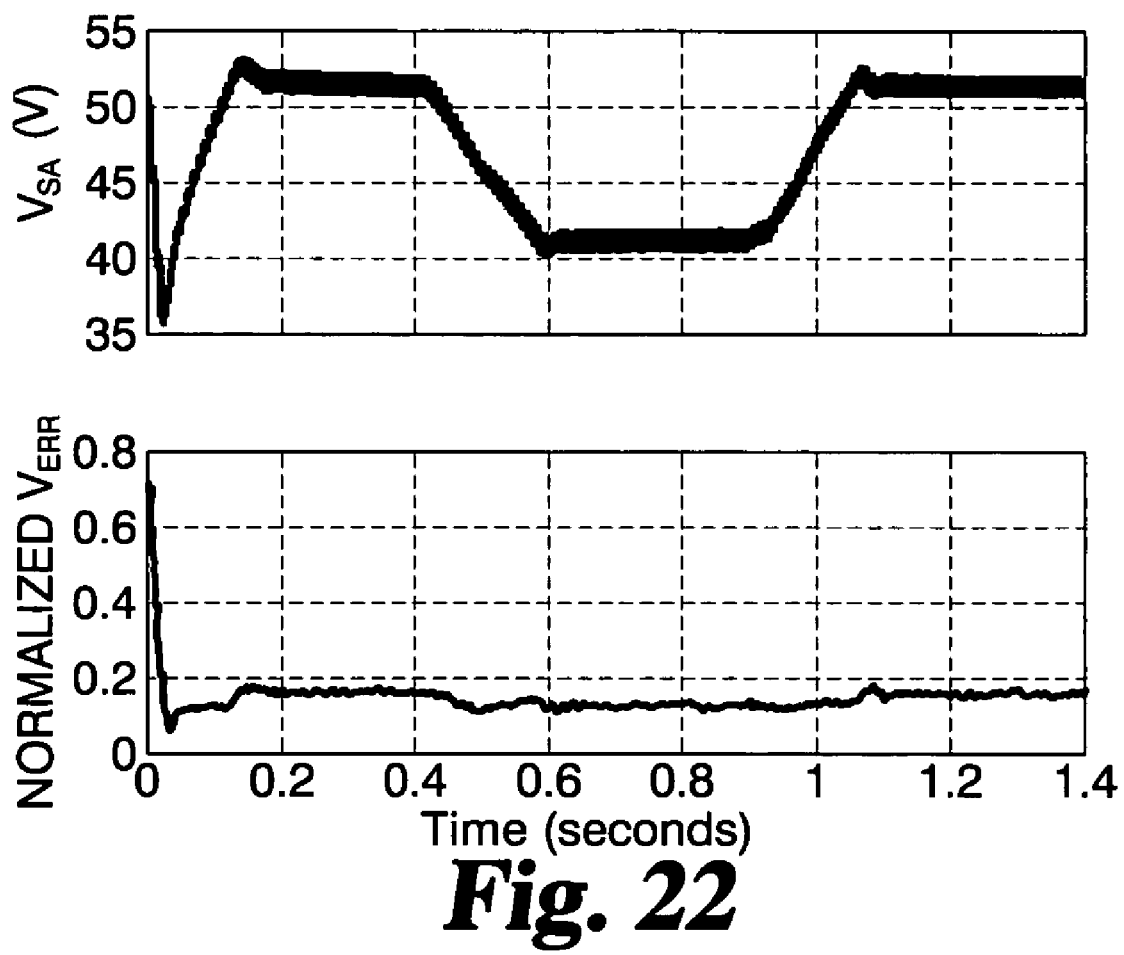
FIG. 22 is a graph of solar array output voltage $V_{SA}$ and voltage error amplifier signal $V_{ERR}$ over time according to one simulated embodiment of the present invention.

As shown in FIG. 21, $V_{SP}$ is continually updated to settle at a voltage corresponding to the array peak-power voltage. When the maximum power point is achieved, $V_{SP}$ goes to steady state to maintain the output power. Different steady states of $V_{SP}$ correspond to different modes of solar array 110. Solar array voltage and output of SA voltage error amplifier ($V_{SA}$ and $V_{ERR}$) are shown in FIG. 22.

3.5 Step Response of MPT

Figure 23:
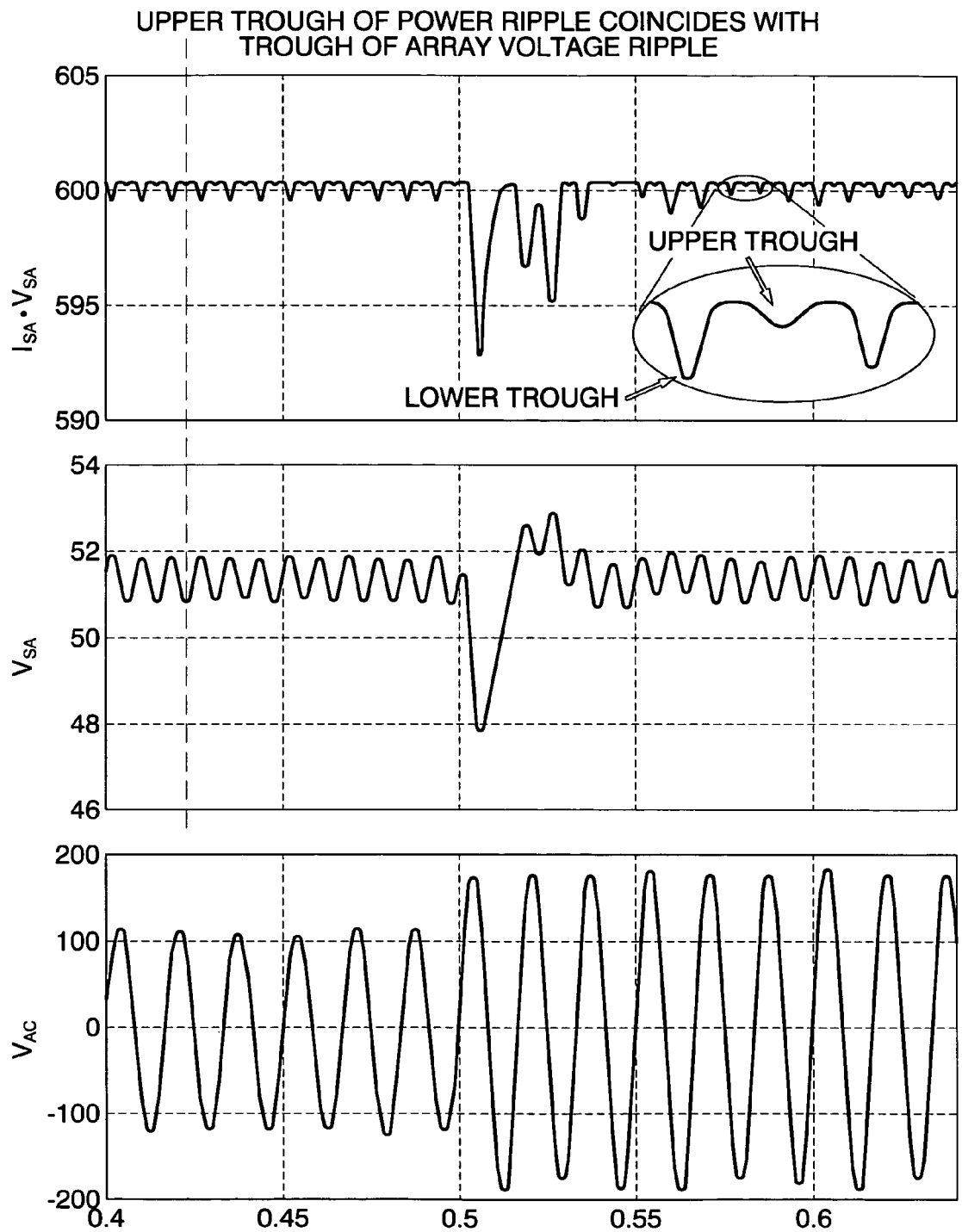
FIG. 23 is a graph of the step response of solar array power $I_{SA} \cdot V_{SA}$, solar array voltage $V_{SA}$, and utility grid voltage $V_{UT}$ over time according to one simulated embodiment of the present invention.

To verify the step response of MPT controller 120, another simulation result is shown in FIG. 23, which shows the step response of SA power ($I_{SA} \cdot V_{SA}$) and SA voltage ($V_{SA}$) when the RMS value of utility grid voltage jumps from 84V to 130V. This illustrates the stability of the system when the utility grid voltage changes.

All patents, publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A power supply adapted to supply AC power to a utility grid, comprising:
    a DC power source having an output voltage;
    a power converter that provides uni-polar output power through a single power stage of DC-DC conversion;
    an unfolding and output filtering grid interface that commutates and filters the uni-polar output power into AC current that is supplied to the utility grid;
    a system controller for
        regulating the output voltage of the DC power source at its maximum power point,
        controlling the waveform of the converter output current to be rectified sinusoidal in phase with the utility grid, and
        reducing the output power when the utility grid voltage exceeds a pre-determined threshold;

wherein the power converter is a cascade connection of an input bulk capacitor, a line-filter for providing sufficient filtering of the converter input current, and the single power stage.

2. The power supply of claim 1, further comprising an input-output isolation means for electrically isolating input of the power converter from its output while electrical power is transferred from the converter input to the converter output through the isolation means operating at a switching frequency, which has an input and an output being electrically isolated from each other, a set of one or more controllable input semiconductor switches that are parts of the converter input circuit but are electrically isolated from the power converter output and controlled by the system controller at the switching frequency to regulate the converter output current to have a rectified sinusoidal waveform, a set of one or more controllable output semiconductor switches that are electrically isolated from the power converter input circuit and controlled by the system controller to convert the rectified sinusoidal output current into an AC output current of sinusoidal waveform that is in phase with the utility grid voltage, an output filtering means for
   absorbing AC switching ripple current from the AC sinusoidal output current and transferring the filtered AC sinusoidal output current into the utility grid and
   attenuating common-mode switching noise that radiate from the output semiconductor switches through the utility grid transmission line, wherein the input-output isolation means and the input semiconductor switches are parts of the power converter and operate together at the same switching frequency which is at least about 20 kHz, wherein the converter output has its power components internally interconnected from the output of the input-output isolation means to the converter output that is externally terminated by the unfolding and output filtering grid interface which comprises the controllable output semiconductor switches and the output filtering means, and wherein the converter input circuit includes the DC power source, the input bulk capacitor, the line filter, and all interconnected components within the converter input section that is connected to the input of the input-output isolation means.

3. The power supply of claim 1, further comprising:

a control-to-output isolation means for electrically isolating the output of the power converter from the system controller whereas controlling signals, that are delivered from the controller to the converter output circuit, and the feedback signals, that are sensed from the power converter output circuit to the controller, are transferred through the control-to-output isolation means that have their inputs and outputs electrically isolated from one another, wherein the system controller, while being isolated from the converter output, can be designed to share a common reference node located at the input-power return terminal that is part of the converter input circuit and the common reference node serves as the signal ground for the controller and the power ground for the converter input circuit.

4. The power supply of claim 1, further comprising:

a transient energy absorption means for absorbing excess or residual transient energy within the power converter and external transient voltage surges produced by or coupled into the utility grid and for protecting components within the power converter output circuit from being over-stressed by excessive transient voltages occurring as a result of the converter residual transient energy and the utility grid voltage surges, wherein the transient energy absorption means comprises a set of interconnected active and passive semiconductor devices that are parts of the unfolding and output filtering grid interface for dissipating the converter transient energy and the utility grid voltage surges, wherein the transient energy absorption means always functions to protect the power converter output circuit during any controlled mode in which the unfolding and output filtering grid interface is commanded to operate, wherein the transient energy absorption means primarily provides energy dissipation and voltage clamping across the converter output for protecting the converter output circuit from being over-stressed when the unfolding and output filtering grid interface is controlled to disconnect the converter output from supplying its output current to the utility grid, and wherein the converter output circuit includes all interconnected components within the converter output section starting from the output of the input-output isolation means to the unfolding and output filtering grid interface.

5. The power supply of claim 1, further comprising:

a relay switching network for directing the filtered AC current to either the utility grid or an emergency stand-alone load; and a utility voltage dropout detector circuit for detecting a grid under-voltage or over-voltage condition, providing a mode transfer control signal for changing the state of the relay switching network from being connected to the utility grid to being connected to the stand-alone load due to the grid under-voltage or over-voltage condition, or vice versa a pre-determined duration after the grid under-voltage or over-voltage condition disappears for at least a pre-determined duration.

6. The power supply of claim 1, further comprising a free-running sinusoidal waveform generator that provides a rectified sinusoidal reference waveform for the system controller and a utility switching signal for controlling the unfolding and filtering utility grid interface.

7. The power supply of claim 1, further comprising an over-current protection circuit for limiting the AC output current to a pre-determined RMS value and preserving the sinusoidal waveform of the AC output current.

8. The power supply of claim 1, further comprising:

one or more semiconductors in a component selected from the component group consisting of
   the DC-DC converter and
   the unfolding and output filter grid interface; and an over-temperature protection circuit for sensing the temperature of the one or more semiconductors and regulating the sensed temperature not to exceed a pre-determined temperature by reducing the output power transferred to the utility grid or a stand-alone load.

9. The power supply of claim 1, wherein the system controller comprises a three-input multiplier that produces a current reference signal for commanding the power converter output current to be rectified sinusoidal.

10. The power supply of claim 1, further comprising:

a stand-by battery for providing additional transient power to support high transient power demand from a stand-alone load to bring the load to operate properly during and after its start-up or a transient load condition;

a first semiconductor battery switch and a second semiconductor battery switch, connected in series, for managing power transfer to and from the stand-by battery; and a battery management control circuit for determining proper mode of the power transfer to and from the said stand-by battery;

wherein each of the first and second semiconductor battery switches has a built-in body diode, and the body diodes within the battery switches are connected in series and with opposite polarity effectively to block current flow when both of the battery switches are turned off.

11. The power supply of claim 10, wherein:

the battery management control circuit controls the first and second semiconductor battery switches to operate the stand-by battery in an isolation mode, a stand-by mode, a charging mode, an input voltage clamping mode, and a battery-dominated input mode;

the stand-by battery is in the isolation mode when the first and second semiconductor battery switches are turned off;

the stand-by battery is in the stand-by mode when the first semiconductor battery switch is turned on, the second semiconductor battery switch is turned off, and the power converter and unfolding and output filtering grid interface provide transient power to the stand-alone load;

the stand-by battery is in the charging mode when the first semiconductor battery switch is turned off and the second semiconductor battery switch is linearly regulated to maintain a healthy state of charge in the stand-by battery at low power, while the system controller regulates the DC power source output voltage at a level that is typically above the battery voltage;

the stand-by battery is in the input voltage clamping mode when the first semiconductor battery switch is turned off, the second semiconductor switch is turned on continuously or linearly regulated with a pulse-width modulation control, and the power converter and unfolding and output filtering grid interface are shut down, to restore a healthy state of charge to the stand-by battery without power transfer to the power converter; and the stand-by battery is in the battery-dominated input mode, when the first semiconductor battery switch is turned on and the second semiconductor switch is turned on continuously or linearly regulated with a pulse-width modulation control, for providing power transfer either
to the stand-alone load when there is no power available from the DC power source, or
for fast battery charging while the power converter is shut down.

12. The power supply of claim 1, further comprising:
a back-up battery;
an input relay switching network that is controlled to electrically connect the input of the power converter alternately to the DC power source or the back-up battery;
a house keeping supply means for providing a DC voltage bias for each control circuit that controls power transfer from the DC power source and the back-up battery to the power converter;
a backup charging means for maintaining a healthy state of charge of the backup battery using power from the utility grid; and
a mode controller means for controlling the backup charging means and the input relay switching network for reliable utilization of the backup battery.

13. The power supply of claim 1, wherein the system controller comprises a means for producing a current reference commanding signal $I_{REF}$ as a function of the inverse RMS value of the converter output voltage, but not as a function of the square of the inverse RMS value of the converter output voltage.

14. The power supply of claim 1, wherein the system controller comprises a means for producing a current reference commanding signal $I_{REF}$ as a function of a rectified sinusoidal reference signal that is synchronized and in-phase with, but produced independently of the magnitude of, the utility grid voltage.

15. The power supply of claim 1, wherein the system controller comprises a means for producing a current reference commanding signal $I_{REF}$ as a function of $V_{ERR}$, the scaled difference between a maximum-power set point voltage and the sensed output voltage of the DC power source.

16. The power supply of claim 15, wherein $V_{ERR}$ serves as the commanding power input that is proportional to the average output power being transferred from the power converter to the utility grid and independent from the utility grid voltage.

17. The power supply of claim 15, further comprising:
a slow voltage-limiting error amplifier for providing active pull-down, through a first diode and an PNP transistor, of $V_{ERR}$ when the RMS voltage across the stand-alone load or the RMS of the utility grid voltage exceeds a pre-determined RMS value, while preserving the sinusoidal waveform of the AC inverter output current;
a fast over-voltage shut-down circuit for providing a quick pull-down, through a second diode and the PNP transistor, of $V_{ERR}$ to shut down the power converter stage when the voltage across the stand-alone load or the utility grid exceeds a predetermined instantaneous value; and
an isolated voltage sense and scaling circuit that senses the rectified inverter output voltage with scaling factor $K_V$ with electrical isolation from the inverter output for feeding the input of both the slow voltage-limiting amplifier and the fast over-voltage shut-down circuit.

18. The power supply of claim 15, further comprising:
a current sense circuit that senses the power converter output current $I_{OUT}$, the current sense circuit being electrically isolated from the uni-polar output, and generating a sensed current signal that represents $I_{OUT}$;
a voltage sense circuit that senses the power converter output voltage $V_{UT}$, the voltage sense circuit being electrically isolated from the uni-polar output, and generating a sensed voltage signal that represents $V_{UT}$;
a slow current-limiting error amplifier for providing active pull down, through a first diode and a PNP transistor, of $V_{ERR}$ when the RMS of the sensed current signal exceeds an RMS threshold, where the RMS threshold is a first function of the voltage supplied to the utility grid, and where the waveform of the AC inverter output current remains sinusoidal;
a fast over-current shut-down circuit for providing a quick pull-down, through a second diode and the PNP transistor, of $V_{ERR}$ to shut down the power converter stage when the instantaneous value of the sensed current signal exceeds an instantaneous threshold, where the instantaneous threshold is a second function of the voltage supplied to the utility grid;

a negative voltage detection circuit means for
detecting that the sensed voltage signal represents a negative voltage at the power converter output; and
producing an enable signal, responsive to the detecting, that enables or shuts down the unfolding and output filtering grid interface;

wherein the enable signal controls a switching bridge driver circuit that enables and disables a square-wave signal generator that drives the unfolding and output filtering grid interface.

19. The power supply of claim 1, further comprising:
a waveform generator that produces a sinusoidal waveform that:
is synchronized and in-phase with, but produced independently of the voltage waveform of the utility grid power,
has total harmonic distortion of less than 2% and has no substantial discontinuity in its waveshape, and
has a fixed amplitude that is independent from the amplitude of the utility grid voltage; and
a current level controller that controls the output current of the single power stage as a function of the high-fidelity sinusoidal waveform.

20. A power supply adapted to supply AC power to a utility grid, comprising:
a DC power source comprising a plurality of distributed DC sources that are individually connected in cascade with respective upstream DC-DC converters, where each upstream DC-DC converter has an output, and the outputs are connected in parallel;
a power converter that provides uni-polar output power through a single power stage of DC-DC conversion;
an unfolding and output filtering grid interface that commutates and filters the uni-polar output power into AC current that is supplied to the utility grid;
a system controller for
controlling the waveform of the converter output current to be rectified sinusoidal in phase with the utility grid, and
reducing the output power when the utility grid voltage exceeds a pre-determined threshold;
wherein the power converter is a cascade connection of an input bulk capacitor, a line-filter for providing sufficient filtering of the converter input current, and the single power stage;
each of the distributed DC sources includes a dedicated maximum power tracking control through the respective upstream DC-DC converter;
the parallel-connected outputs of the upstream DC-DC converters provide DC power to the single power stage; and
the system controller regulates the power source voltage at a fixed DC voltage.

21. A method of converting power from a DC power source into AC power, comprising:
detecting the utility grid power ripple;
sensing a current proceeding from the DC power source into a power conversion stage, wherein the output current of the power conversion stage is controlled by a control signal that possesses a rectified sinusoidal waveform of a proper amplitude;
sensing a voltage across the DC power source;
generating a power signal as a function of the product of the sensed current and the sensed voltage;
detecting an AC power ripple from the power signal and an AC voltage ripple from the sensed voltage, each ripple appearing as an inherent result of operation of the power conversion stage;
extracting a first dither signal from the AC power ripple, and a second dither signal from the AC voltage ripple;
deriving a dither signal inherently available from the utility grid power ripple; and
converting power from the DC power source into AC power, including:
determining the proper tracking direction toward the maximum power point of the DC source, and
providing inherent dithering as a result of regulating the sensed output current to track the rectified sinusoidal control signal, and
deriving the proper amplitude of the rectified sinusoidal within the control signal through a three-input multiplier.

22. A power supply adapted to supply AC power, comprising:
a DC power source having an output voltage $V_{SA}$ and an output current $I_{SA}$;
a first low-pass filter taking $V_{SA}$ as an input and providing a filtered voltage level $V_{LP}$ as an output;
a second low-pass filter taking $I_{SA}$ as an input and providing a filtered current level $I_{LP}$ as an output;
an analog multiplier taking filtered voltage level $V_{LP}$ and filtered current level $I_{LP}$ as inputs, and providing a scaled power output level $P_{SA} = k \cdot V_{LP} \cdot I_{LP}$ as an output, for a predetermined value k;
a first analog differentiator taking filtered voltage level $V_{LP}$ as an input, and providing voltage derivative signal $Vac_{SA}$ as an output;
a second analog differentiator taking scaled power output level $P_{SA}$ as an input, and providing power derivative signal $Pac_{SA}$ as an output;
a set point searching means for searching for a set point voltage $V_{SP}$ as a function of the voltage derivative signal $Vac_{SA}$ and power derivative signal $Pac_{SA}$; and
a feedback means for controlling the DC power source output voltage $V_{SA}$ to track the voltage, being proportional to the set point voltage $V_{SP}$, that eventually reaches and swings back and forth around the maximum power voltage of the DC power source.

23. The power supply of claim 22, wherein at least one of the first and second analog differentiators is a two-stage active filter, comprising:
a first-order high-pass active filter having a high-pass-filter input, the first-order high-pass active filter being connected in cascade with
a first-order inverted low-pass active filter that includes an inductor;
wherein the first-order high-pass active filter has a transfer function of the form $$\frac{k_1 \cdot s}{\frac{s}{\omega o} + 1},$$

including a network comprising a feedback resistor, a series R-C two-terminal network, and an operational amplifier;
the first-order inverted low-pass active filter has a transfer function of the form $$\left(\frac{s}{\omega o}+1\right)/k_2,$$

and includes a network comprising an input resistor, a series L-R two-terminal network, and an operational amplifier;

the series R-C two-terminal network comprises a capacitor and a resistor connected in series, and is terminated between the input of the high-pass active filter and the inverting input of the operational amplifier within the high-pass active filter;

the series L-R two-terminal network comprises an inductor and a resistor connected in series, and is terminated between the output of the inverted low-pass active filter and the inverting input of the operational amplifier within the inverted low-pass active filter;

the feedback resistor is terminated across the inverting input and the output of the operational amplifier within the high-pass active filter;

the input resistor is terminated across the input of the inverted low-pass filter and the inverting input of the operational amplifier within the inverted low-pass active filter; and the overall transfer function of the two-stage filter has the form $(k_1/k_2)\cdot s$.

24. The power supply of claim 22, wherein at least one of the first and second analog differentiators is a two-stage active filter, comprising:

a first-order high-pass active filter having a high-pass-filter input, the first-order high-pass active filter being connected in cascade with a first-order inverted low-pass active filter having no inductor;

wherein the first-order high-pass active filter has a transfer function of the form $$\frac{k_1 \cdot s}{\frac{s}{\omega o}+1},$$

including a network comprising a first feedback resistor, a series R-C two-terminal network, and a first operational amplifier;

the first-order inverted low-pass active filter has a transfer function of the form $$\left(\frac{s}{\omega o}+1\right)/k_2,$$

including a network comprising a second feedback resistor, a parallel R-C two-terminal network, and a second operational amplifier;

the parallel R-C two-terminal network comprises a capacitor and a resistor connected in parallel, and is terminated between the input of the inverted low-pass active filter and the inverting input of the operational amplifier within the inverted low-pass filter;

the series R-C two-terminal network comprises a capacitor and a resistor connected in series, and is terminated between the input of the high-pass active filter and the inverting input of the operational amplifier within the high-pass active filter;

each of the feedback resistors is terminated across the inverting input and the output of the respective operational amplifier; and the overall transfer function of the two-stage filter has the form $(k_1/k_2)\cdot s$.

25. A DC-to-AC power conversion system, comprising:

a utility grid interface having two input terminals and two output terminals;

a uni-directional switching bridge, comprising two upper uni-directional semiconductor switches and two lower uni-directional semiconductor switches, that takes the rectified converter output current $I_{OUT}$ as an input and provides AC output as inverter output current ($I_{AC}$) feeding into the two input terminals of the utility grid interface, wherein each uni-directional semiconductor switch has an upper terminal and a lower terminal;

a DC-DC converter output having positive and return terminals, where the positive terminal is connected to the upper terminals of the two upper uni-directional semiconductor switches within the switching bridge, and the return output terminal is connected to the lower terminals of the two lower uni-directional semiconductor switches within the switching bridge;

a full bridge rectifier taking the signal between the two input terminals of the utility grid interface as input, and providing a positive output and a negative output; and an energy absorption device (730) electrically connected between the positive output and the negative output of the rectifier;

wherein the DC-DC converter positive output terminal is connected to the positive output of the rectifier (720) through a forward-biased diode (D5);

wherein each of the upper and lower uni-directional semiconductor switches comprises a diode and a semiconductor switch connected in series and has an upper terminal and a lower terminal; and wherein each semiconductor switch is a transistor selected from the group consisting of:
a bipolar junction transistor (BJT),
a metal-oxide semiconductor field effect transistor (MOSFET), and
an insulated-gate bipolar junction transistor (IGBT).

26. The apparatus of claim 25 wherein the output current of the apparatus is controlled to make its output current have a sinusoidal waveform that in a first mode, is in-phase with the utility grid voltage that possesses insignificant inductive characteristics, or in a second mode, is delivered into a stand-alone resistive load that has insignificant inductive characteristics;

wherein the first mode and the second mode are accomplished by controlling a relay switching network for directing the filtered AC current to either the utility grid or an emergency stand-alone load.

27. The system of claim 25, wherein:

the lower terminal of each upper uni-directional semiconductor switch is connected in series with the upper terminal of the respective lower uni-directional semiconductor switch;

further comprising a control signal that controls the upper semiconductor switches to disconnect the output terminal of the DC-DC converter from supplying AC power to the utility grid as a result of loss of synchronization with the utility grid voltage.

28. A power supply adapted to provide AC power from a DC power source to a utility grid having a utility grid transmission line, comprising:
- a DC-DC power conversion stage
  - having a converter output inductor and providing a rectified converter output current $I_{OUT}$ between a first conductor and a second conductor, where the voltage potential of the first conductor is at least about as great as the potential of the second conductor;
- a uni-directional switching bridge, comprising four or more uni-directional switches, that takes the rectified converter output current $I_{OUT}$ as an input and provides AC output as inverter output current ($I_{AC}$) to the utility grid;
- a full-bridge rectifier that takes the AC output as its input and provides a fully rectified output between a positive terminal and a negative terminal;
- a transient energy absorption device (730, 930, 931) electrically connected between the positive terminal and the negative terminal; and
- a bleeding diode that provides a current path for a portion of
  - excess energy stored in the converter output inductor and
  - external transient energy coupled to or residual energy stored in the utility grid transmission line to be absorbed by the transient energy absorption device;
- wherein the excess inductive energy in the rectified converter output current $I_{OUT}$ is directed from the first conductor into the transient energy absorption network, and excess energy in forms of voltage surges produced from the utility grid is directed through the following devices:
  - the bleeding diode,
  - one or more of the semiconductor switches in the uni-directional switching bridge,
  - the full-bridge rectifier, and
  - the transient energy absorption device;
- wherein the external transient energy in forms of voltage surges produced from the utility grid is directed through the following devices:
  - one of the semiconductor switches in the uni-directional switching bridge,
  - the full-bridge rectifier, and
  - the transient energy absorption device; and
- wherein the uni-directional switches each comprise a series connection between a diode and a semiconductor switch selected from the switch group consisting of a MOSFET, a BJT, and an IGBT.

29. A power supply adapted to provide AC power from a DC power source to a utility grid with energy transient absorption capability, comprising:
- a DC-DC uni-directional converter power stage having an AC converter output current $I_{AC}$ between a first conductor and a second conductor, where the voltage potential of the first conductor relative to the second conductor is sinusoidal and in-phase with the utility grid voltage, and comprising an output-coupled inductor having a first winding and a second winding;
- a first and a second uni-directional transient energy absorption network, each comprising a diode and a uni-directional transient absorber connected in series, the uni-directional transient energy absorption devices being connected in series with opposite polarity to provide bi-directional transient energy absorption; and
- wherein excess energy in the output-coupled inductor is directed through either
  - a first diode, the first winding of the output-coupled inductor, a second diode, and the first uni-directional transient energy absorption network, or
  - a third diode, the second winding of the output-coupled inductor, a fourth diode, and the second uni-directional transient energy absorption network; and
- excess energy from the utility grid is directed through either
  - a first semiconductor switch and the first transient energy absorption network,
  - a second semiconductor switch and the second transient energy absorption network; and
- wherein the first and second semiconductor switches have their respective paralleled or built-in body diodes for providing current paths for the excess energy from the utility grid to be absorbed by the first and the second transient energy absorption networks.

* * * * *